US008921007B2

(12) United States Patent
Lin et al.

(10) Patent No.: US 8,921,007 B2
(45) Date of Patent: Dec. 30, 2014

(54) SOLID OXIDE FUEL CELL INTERCONNECT CELLS

(71) Applicants: Guangyong Lin, Shrewsbury, MA (US); Yeshwanth Narendar, Westford, MA (US); John D. Pietras, Sutton, MA (US); Qiang Zhao, Bensalem, PA (US); Robert J. Sliwoski, West Boylston, MA (US); Caroline Levy, Montpellier (FR); Samuel S. Marlin, Plan d'Orgon (FR); Aravind Mohanram, Northborough, MA (US)

(72) Inventors: Guangyong Lin, Shrewsbury, MA (US); Yeshwanth Narendar, Westford, MA (US); John D. Pietras, Sutton, MA (US); Qiang Zhao, Bensalem, PA (US); Robert J. Sliwoski, West Boylston, MA (US); Caroline Levy, Montpellier (FR); Samuel S. Marlin, Plan d'Orgon (FR); Aravind Mohanram, Northborough, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 87 days.

(21) Appl. No.: 13/676,838

(22) Filed: Nov. 14, 2012

(65) Prior Publication Data

US 2013/0137014 A1 May 30, 2013

Related U.S. Application Data

(60) Provisional application No. 61/560,177, filed on Nov. 15, 2011.

(51) Int. Cl.
| | |
|---|---|
| *H01M 4/02* | (2006.01) |
| *H01M 8/02* | (2006.01) |
| *H01M 4/90* | (2006.01) |
| *H01M 8/12* | (2006.01) |
| *H01M 8/10* | (2006.01) |
| *H01M 8/24* | (2006.01) |

(52) U.S. Cl.
CPC .......... *H01M 8/0282* (2013.01); *H01M 8/0228* (2013.01); *Y02E 60/50* (2013.01); *H01M 8/0217* (2013.01); *Y02E 60/525* (2013.01); *H01M 8/0236* (2013.01); *H01M 2008/1293* (2013.01); *Y02E 60/521* (2013.01); *H01M 8/1213* (2013.01); *H01M 4/9066* (2013.01); *H01M 4/905* (2013.01); *H01M 4/9033* (2013.01); *H01M 8/1004* (2013.01); *H01M 8/2425* (2013.01)
USPC ........... 429/523; 429/465; 429/477; 429/479; 429/481; 429/482; 429/484; 429/485; 429/486; 429/489; 429/491; 429/510

(58) Field of Classification Search
CPC ................... H01M 8/2425; H01M 2008/1293; H01M 8/0282; Y02E 60/50; Y02E 60/521; Y02E 60/525
USPC ......... 429/465, 477, 479, 481, 482, 484, 485, 429/486, 489, 491, 510, 523
See application file for complete search history.

(56) References Cited

U.S. PATENT DOCUMENTS

| | | | | |
|---|---|---|---|---|
| 6,887,361 | B1 * | 5/2005 | Visco et al. | .................. 204/491 |
| 2002/0177031 | A1 | 11/2002 | Doshi et al. | |

(Continued)

FOREIGN PATENT DOCUMENTS

JP         07-073888 A        3/1995

OTHER PUBLICATIONS

International Search Report for PCT/US2012/065053 dated Mar. 27, 2013, 2 pages.

(Continued)

*Primary Examiner* — Patrick Ryan
*Assistant Examiner* — Ben Lewis
(74) *Attorney, Agent, or Firm* — Abel Law Group, LLP; Robert N. Young

(57) ABSTRACT

A bonding layer, disposed between an interconnect layer and an electrode layer of a solid oxide fuel cell article, may be formed from a yttria stabilized zirconia (YSZ) powder having a monomodal particle size distribution (PSD) with a $d_{50}$ that is greater than about 1 μm and a $d_{90}$ that is greater than about 2 μm.

23 Claims, 18 Drawing Sheets

(56) References Cited

U.S. PATENT DOCUMENTS

| | | | |
|---|---|---|---|
| 2005/0271919 A1* | 12/2005 | Hata et al. | 429/30 |
| 2007/0003819 A1 | 1/2007 | Zhang | |
| 2007/0015045 A1* | 1/2007 | Lee et al. | 429/45 |
| 2009/0023027 A1 | 1/2009 | Hata | |
| 2010/0159356 A1* | 6/2010 | Mahoney | 429/495 |
| 2010/0178589 A1* | 7/2010 | Kwon et al. | 429/507 |
| 2010/0183947 A1* | 7/2010 | Mohanram et al. | 429/495 |

OTHER PUBLICATIONS

Chaichanawong, Jintawat et al., "Influence of Size Distribution of LSM/YSZ Composite Powder on Microstructure and Performance of SOFC Cathode," Transactions of JWRL, vol. 34 (2005), No. 1, 5 pages.

Chen, Z.-C., "Microsturcture and Electrical Conductivity of NI/YSZ Cermets for SOFC," 16th International Conference of Composite Materials, 2007, pp. 1-6.

\* cited by examiner

SOLID OXIDE FUEL CELL INTERCONNECT CELLS

CROSS-REFERENCE TO RELATED APPLICATION

This application claims priority under 35 U.S.C. §119(e) to U.S. Patent Application No. 61/560,177, entitled "Solid Oxide Fuel Cell Interconnect Cells," naming inventors Guangyong Lin et al., filed Nov. 15, 2011, which application is incorporated by reference herein in its entirety.

BACKGROUND

1. Field of the Disclosure

The present disclosure is related to solid oxide fuel cells (SOFCs).

2. Description of the Related Art

A fuel cell is a device that generates electricity by a chemical reaction. Among various fuel cells, solid oxide fuel cells (SOFCs) use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode.

In some instances, fuel cell assemblies have been designed as stacks, which include a cathode, anode, and solid electrolyte between the cathode and the anode. Each stack can be considered a subassembly, which can be combined with other stacks to form a full SOFC article. In assembling the SOFC article, electrical interconnects can be disposed between the cathode of one stack and the anode of another stack.

However, stacks of individual fuel cells can be susceptible to damage caused by fluctuation in temperature during their formation or use. Specifically, materials employed to form the various components, including ceramics of differing compositions, exhibit distinct material, chemical, and electrical properties that can result in breakdown and failure of the SOFC article. In particular, fuel cells have a limited tolerance for changes in temperature. Problems associated with mechanical stress caused by changes in temperature are exacerbated when individual fuel cells are stacked. Limited thermal shock resistance of fuel cells, particularly of fuel cells assembled in stacks, limits the yield of production and poses a heightened risk of failure during operation. What is needed is an improved bonding layer for use with stacked fuel cells.

SUMMARY

According to one embodiment, a bonding layer of a solid oxide fuel cell article is disclosed. The bonding layer is disposed between an interconnect layer and an electrode layer of the solid oxide fuel cell article. The bonding layer may be formed from a yttria stabilized zirconia (YSZ) powder having a monomodal particle size distribution (PSD) with a $d_{50}$ that is greater than about 1 μm and a $d_{90}$ that is greater than about 2 μm.

According to another embodiment, an interconnect cell of a solid oxide fuel cell stack is disclosed. The interconnect cell includes an interconnect layer, a cathode bonding layer, and an anode bonding layer. The cathode bonding layer is disposed between the interconnect layer and a cathode layer of the solid oxide fuel cell stack, and the anode bonding layer is disposed between the interconnect layer and an anode layer of the solid oxide fuel cell stack. The cathode bonding layer is formed from a YSZ powder having a monomodal PSD with a $d_{50}$ that is greater than about 1 μm and a $d_{90}$ that is greater than about 2 μm. Further, the anode bonding layer is formed from a YSZ powder having a monomodal PSD with a $d_{50}$ that is greater than about 1 μm and a $d_{90}$ that is greater than about 2 μm.

According to another embodiment, an interconnect cell of a solid oxide fuel cell stack is disclosed. The interconnect cell includes an interconnect layer, a cathode bonding layer, and an anode bonding layer. The cathode bonding layer is disposed between the interconnect layer and a cathode layer of the solid oxide fuel cell stack, and the anode bonding layer is disposed between the interconnect layer and an anode layer of the solid oxide fuel cell stack. The cathode bonding layer and the anode bonding layer include yttria stabilized zirconia. The interconnect cell reaches a Steady State Area Specific Resistance (ASR) (ohms.cm$^2$) within a time period of not less than about 600 hours of operation.

According to another embodiment, a solid oxide fuel cell stack is disclosed that includes a first electrode layer, a first electrolyte layer overlying the first electrode layer, a second electrode layer overlying the first electrolyte layer, and an interconnect cell disposed between the second electrode layer and a third electrode layer. A second electrolyte layer overlies the third electrode layer, and a fourth electrode layer overlies the second electrolyte layer. The interconnect cell includes an interconnect layer, a first bonding layer, and a second bonding layer. The first bonding layer includes YSZ and is disposed between the interconnect layer and the second electrode layer. The first bonding layer is formed from a YSZ powder having a monomodal PSD with a $d_{50}$ that is greater than about 1 μm and a $d_{90}$ that is greater than about 2 μm. The second bonding layer includes YSZ and is disposed between the interconnect layer and the third electrode layer. The second bonding layer is formed from a YSZ powder having a monomodal PSD with a $d_{50}$ that is greater than about 1 μm and a $d_{90}$ that is greater than about 2 μm.

According to yet another embodiment, a solid oxide fuel cell stack is disclosed that includes a first electrode layer, a first electrolyte layer overlying the first electrode layer, a second electrode layer overlying the first electrolyte layer, and an interconnect cell disposed between the second electrode layer and a third electrode layer. A second electrolyte layer overlies the third electrode layer, and a fourth electrode layer overlies the second electrolyte layer. The interconnect cell includes an interconnect layer, a first bonding layer, and a second bonding layer. The first bonding layer includes YSZ and is disposed between the interconnect layer and the second electrode layer. The second bonding layer includes YSZ and is disposed between the interconnect layer and the third electrode layer. The interconnect cell reaches a Steady State Area Specific Resistance (ASR) (ohms.cm$^2$) within a time period of not less than about 600 hours of operation.

According to yet another embodiment, a method of forming an interconnect cell of a solid oxide fuel cell stack includes forming a green interconnect cell. The green interconnect cell includes a first green bonding layer that includes a YSZ powder having a monomodal PSD with a $d_{50}$ that is greater than about 1 μm and a $d_{90}$ that is greater than about 2 μm. The green interconnect cell further includes a green interconnect layer overlying the first green bonding layer and a second green bonding layer overlying the green interconnect layer. The second green bonding layer includes a YSZ powder having a monomodal PSD with a $d_{50}$ that is greater than about 1 μm and a $d_{90}$ that is greater than about 2 μm. The method further includes sintering the first green bonding layer, the green interconnect layer, and the second green bonding layer to integrally bond the first green bonding layer, the green interconnect layer, and the second green bonding layer to form an integrated, densified interconnect cell.

According to another embodiment, a method of forming an integrated SOFC stack is disclosed. The method includes forming a first green cell structure having a first green electrode layer, a green electrolyte layer overlying the first green electrode layer, and a second green electrode layer overlying the green electrolyte layer. The method includes forming a second green cell structure having a first green electrode layer, a green electrolyte layer overlaying the first green electrode layer, and a second green electrode layer overlying the green electrolyte layer. The method further includes forming a green interconnect cell disposed between the first green cell structure and the second green cell structure. The green interconnect cell includes a green interconnect layer, a first green bonding layer, and a second green bonding layer. The first green bonding layer is disposed between the interconnect layer and the first green cell structure, and the second green bonding layer is disposed between the interconnect layer and the second green cell structure. The first green bonding layer includes a YSZ powder having a monomodal PSD with a $d_{50}$ that is greater than 1 μm and a $d_{90}$ that is greater than 2 μm. The second green bonding layer includes a YSZ powder having a monomodal PSD with a $d_{50}$ that is greater than 1 μm and a $d_{90}$ that is greater than 2 μm. The method further includes sintering the first green cell structure, the green interconnect cell, and the second green cell structure to integrally bond the first green cell structure, the green interconnect cell and the second green cell structure to form an integrated SOFC stack.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION

The present disclosure is related to solid oxide fuel cell (SOFC) articles including SOFC stacks and methods of forming the SOFC stacks. A material that includes yttria stabilized zirconia (YSZ) with a particular particle size distribution (PSD) may be used in bonding layers that are disposed between an interconnect layer and electrodes of different SOFC cells of an SOFC stack. Interconnect cells that include bonding layers formed from such YSZ powders may exhibit improved long term performance.

Figure 1:
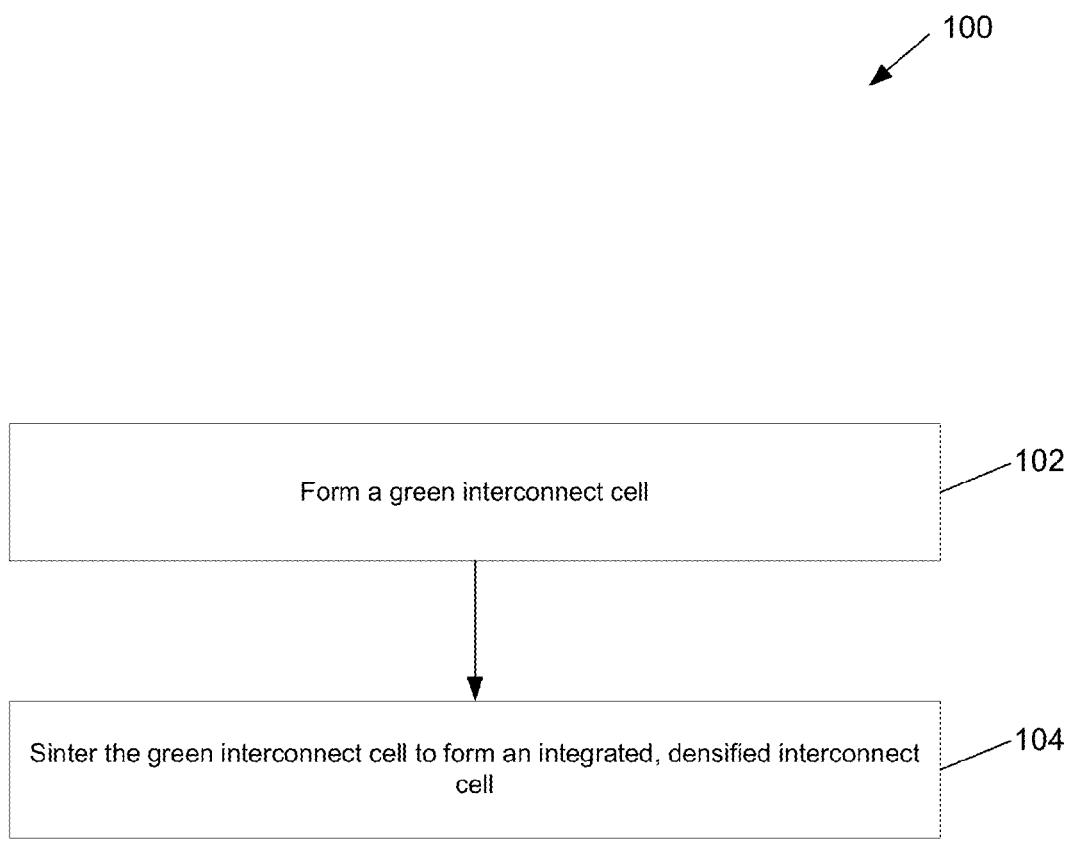
FIG. 1 illustrates a method of forming an interconnect cell of a solid oxide fuel cell stack according to an embodiment.

Referring to FIG. 1, a particular embodiment of a method of forming an interconnect cell of a solid oxide fuel cell stack is illustrated and generally designated 100. The method 100 includes forming a green interconnect cell, at 102. In a particular embodiment, the green interconnect cell can include a green bonding layer that includes a YSZ powder having a monomodal PSD with a $d_{50}$ that can be greater than 0.7 μm and a $d_{90}$ that can be 1.5 μm or greater; more preferably the YSZ powder can have with a $d_{50}$ that can be greater than 1 μm and a $d_{90}$ that can be greater than 2 μm. In some embodiments the YSZ powder can have with a $d_{50}$ that can be greater than 2 μm and a $d_{90}$ that can be greater than 4 μm. In a particular embodiment, the green interconnect cell further includes a green interconnect layer overlying the green bonding layer and a second green bonding layer overlying the green interconnect layer. The second green bonding layer may include a YSZ powder having a monomodal PSD with a $d_{50}$ that can be greater than 0.7 μm and a $d_{90}$ that can be 1.5 μm or greater, more preferably a $d_{50}$ greater than 1 μm and a $d_{90}$ greater than 2 μm. In some embodiments the YSZ powder can have with a $d_{50}$ that can be greater than 2 μm and a $d_{90}$ that can be greater than 4 μm. Coarse particles in the bonding layers may have a puncturing effect. As such, in a particular embodiment, not less than 99 vol % of particles of the green YSZ powder have a particle size diameter that is less than 10 μm.

The method 100 further includes sintering the green interconnect cell to form an integrated, densified interconnect cell, at 104. In a particular embodiment, sintering the green interconnect cell includes sintering (e.g., free sintering, hot pressing) a first green bonding layer, the green interconnect layer, and a second green bonding layer to integrally bond the first green bonding layer, the green interconnect layer, and the second green bonding layer.

Applicants have discovered that an SOFC unit cell including an interconnect cell that includes a bonding layer formed according to embodiments herein can have improved electrochemical performance. For example, cracking in the interconnect cell may be reduced. As another example, the interconnect cell may exhibit improved performance with respect to degradation of area specific resistance (ASR) during operation.

One function of an interconnect layer in an SOFC stack is as a connector to provide an electron conductor so that the electron can be transferred from one cell to another. Another function of the interconnect layer is as a gas separator to ensure that the fuel gas such as $H_2$ or $CH_4$ in the anode side would not mix with the oxidant such as air in the cathode directly. Any cracks in the interconnect layer may cause the reduction of the electron conduction area and may allow gas cross leakage, reducing its functions as the electron conductor and the gas separator. Therefore, any cracks in the interconnects should be avoided.

The interconnect layer provides an electron conductor and a gas separator so that the SOFC stack performance such as the power density is inversely proportional to (partially dependent on) the resistance of the interconnect layer, in the term of area specific resistance (ASR). A higher ASR of the interconnect cell may cause a lower power density of the SOFC stack. ASR degradation of the interconnect cell over time may result in reducing SOFC stack performance such as the power density degradation. Therefore, an interconnect cell with a low ASR and a low ASR degradation may allow for improving SOFC stack performance. Electrochemical ("E-chem") testing may be used to determine whether the ASR of the interconnect cell is decreasing and/or stable over time (i.e., whether there is ASR degradation).

As used herein, the term "Steady State" ASR refers to a region on a long term ASR testing curve where the ASR is lowest. That is, an ASR testing curve with ASR (ohms.cm$^2$) plotted on the Y axis and time (hours) plotted on the X axis, and the Steady State ASR is the ASR value in the region of the curve that has a slope of approximately zero. Said another way, the Steady State ASR is the ASR value that is measured at the approximate time when the ASR value begins to increase along the Y axis (i.e., when ASR "degradation" begins). In a particular embodiment, an interconnect cell may reach a Steady State ASR within a time period of not less than about 600 hours of operation.

In a particular embodiment, the ASR of an interconnect cell may reach the Steady State ASR within a time period of not less than about 600 hours, such as not less than about 700 hours, not less than about 800 hours, not less than about 900 hours, not less than about 1000 hours, not less than about 1100 hours, not less than about 1200 hours, not less than about 1300 hours, not less than about 1400 hours, not less than about 1500 hours, or even not less than about 1600 hours.

The layers described according to the embodiments herein can be formed through techniques including, but not limited to, casting, deposition, printing, extruding, lamination, die-pressing, gel casting, spray coating, screen printing, roll compaction, injection molding, and a combination thereof. In one particular instance, each of the layers can be formed via screen printing. In another embodiment, each of the layers can be formed via a tape casting process.

Figure 2:
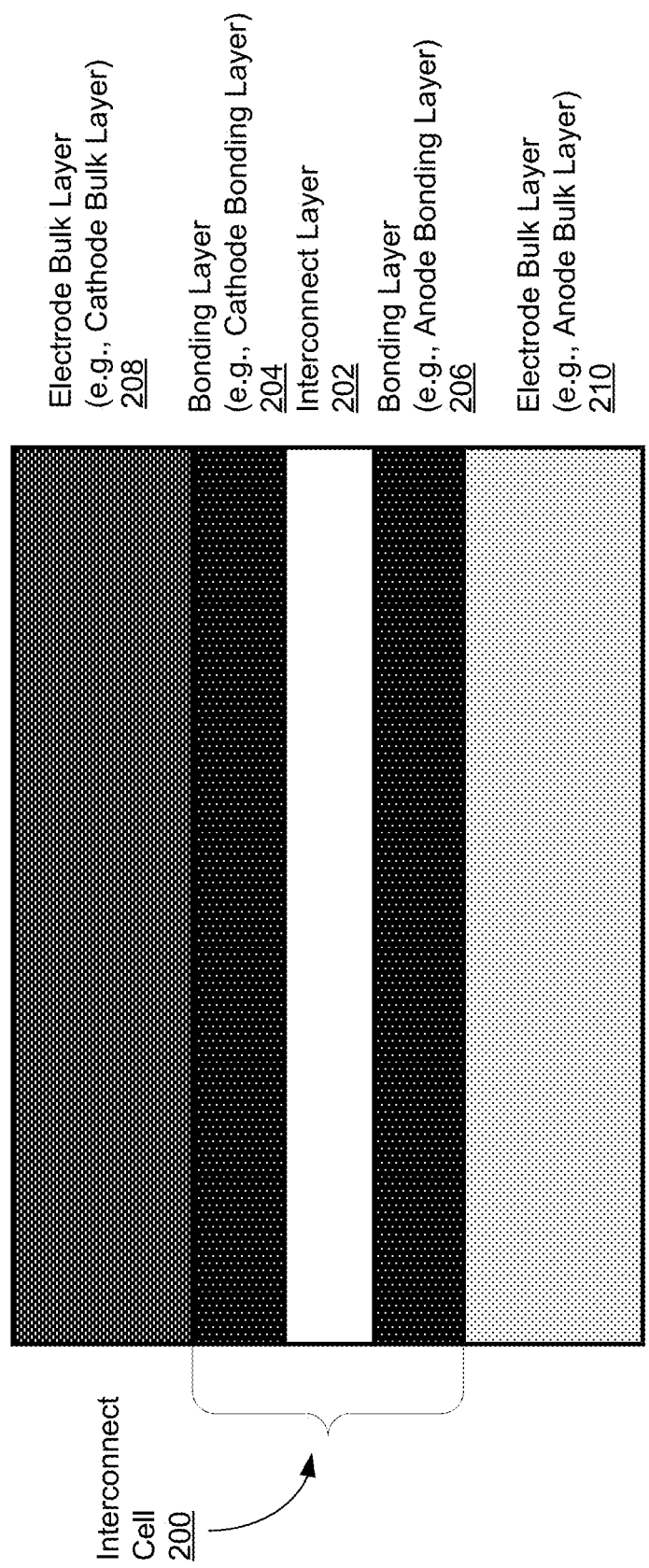
FIG. 2 is an illustration of an interconnect cell disposed between two electrode bulk layers of the SOFC stack in accordance with an embodiment.

FIG. 2 includes an illustration of an interconnect cell 200 disposed between two electrodes of an SOFC stack in accordance with an embodiment. In a particular embodiment, the interconnect cell 200 of FIG. 2 may be formed via the method 100 of FIG. 1.

The interconnect cell 200 of FIG. 2 includes an interconnect layer 202, a first bonding layer 204, and a second bonding layer 206. The first bonding layer 204 may be disposed between the interconnect layer 202 and a first electrode bulk layer 208 of the SOFC stack, and the second bonding layer 206 may be disposed between the interconnect layer 202 and a second electrode bulk layer 210 of the SOFC stack. That is, the first bonding layer 204 may overly the interconnect layer 202, and the interconnect layer 202 may overly the second bonding layer 206. In the embodiment illustrated, the bonding layers 204, 206 are in direct contact with the interconnect layer 202.

The first electrode bulk layer 208 may be in direct contact with the first bonding layer 204, which may be in direct contact with the interconnect layer 202. The interconnect layer 202 may be in direct contact with the second bonding layer 206, which may be in direct contact with the second electrode bulk layer 210. In the illustrative non-limiting embodiment illustrated in FIG. 2, the first electrode bulk layer 208 includes a cathode bulk layer, and the first bonding layer 204 includes a cathode bonding layer. Further, the second electrode bulk layer 210 includes an anode bulk layer, and the second bonding layer 206 includes an anode bonding layer. That is, in the embodiment illustrated in FIG. 2, the cathode bulk layer overlies the anode bulk layer, with the interconnect layer 202 (and associated bonding layers 204, 206) disposed between the two electrode bulk layers. Alternatively, the anode bulk layer may overly the cathode bulk layer with the interconnect layer 202 (and associated bonding layers 204, 206) disposed between the two electrode bulk layers. For illustrative purposes only, the first bonding layer 204 and the first electrode bulk layer 208 will be referred to as the cathode bonding layer and cathode bulk layer, respectively. Similarly, the second bonding layer 206 and the second electrode bulk layer 210 will be referred to as the anode bonding layer and anode bulk layer, respectively.

In a particular embodiment, the porosity of the cathode bonding layer 204 may be not less than about 5 vol %, such as not less than about 6 vol %, not less than about 7 vol %, not less than about 8 vol %, not less than about 9 vol %, not less than about 10 vol %, not less than about 11 vol %, or even not less than about 12 vol %. Further, the porosity of the cathode bonding layer 204 may be not greater than about 60 vol %, such as not greater than about 55 vol %, not greater than about 50 vol %, not greater than about 45 vol %, not greater than about 43 vol %, not greater than about 41 vol %, or even not greater than about 40 vol %. It will be appreciated that the cathode bonding layer 204 can have a porosity within a range including any of the minimum and maximum values noted above.

In a particular embodiment, the porosity of the anode bonding layer 206 may be not less than about 5 vol %, such as not less than about 6 vol %, not less than about 7 vol %, not less than about 8 vol %, not less than about 9 vol %, not less than about 10 vol %, not less than about 11 vol %, or even not less than about 12 vol %. Further, the porosity of the anode bonding layer 206 may be not greater than about 60 vol %, such as not greater than about 55 vol %, not greater than about 50 vol %, not greater than about 45 vol %, not greater than about 43 vol %, not greater than about 41 vol %, or even not greater than about 40 vol %. It will be appreciated that the anode bonding layer 206 can have a porosity within a range including any of the minimum and maximum values noted above.

As an illustrative, non-limiting embodiment, the cathode bonding layer 204 may have an average thickness that is not greater than about 100 µm, such as not greater than about 90 µm, not greater than about 80 µm, not greater than about 70 µm, not greater than about 60 µm, or even not greater than about 50 µm. Further, the cathode bonding layer 204 may have an average thickness that is not less than about 5 µm, not less than about 6 µm, not less than about 7 µm, not less than about 8 µm, not less than about 9 µm, or even not less than about 10 µm. It will be appreciated that the cathode bonding layer 204 can have an average thickness within a range including any of the minimum and maximum values noted above.

As an illustrative, non-limiting embodiment, the anode bonding layer 206 may have an average thickness that is not greater than about 100 µm, such as not greater than about 90 µm, not greater than about 80 µm, not greater than about 70 µm, not greater than about 60 µm, or even not greater than about 50 µm. Further, the anode bonding layer 206 may have an average thickness that is not less than about 5 µm, not less than about 6 µm, not less than about 7 µm, not less than about 8 µm, not less than about 9 µm, or even not less than about 10 µm. It will be appreciated that the anode bonding layer 206 can have an average thickness within a range including any of the minimum and maximum values noted above.

The cathode bulk layer 208 may have an average thickness of at least about 0.10 mm, such as least about 0.15 mm, such as at least about 0.20 mm, or even at least about 0.25 mm Further, the cathode bulk layer 208 may have an average thickness that is not greater than about 2 mm, such as not greater than about 1.9 mm, not greater than about 1.8 mm, not greater than about 1.7 mm, not greater than about 1.6 mm, or even not greater than about 1.5 mm It will be appreciated that the cathode bulk layer 208 can have an average thickness within a range including any of the minimum and maximum values noted above.

The anode bulk layer 210 may have an average thickness of at least about 0.10 mm, such as least about 0.15 mm, such as at least about 0.20 mm, or even at least about 0.25 mm Further, the anode bulk layer 210 may have an average thickness that is not greater than about 2 mm, such as not greater than about 1.9 mm, not greater than about 1.8 mm, not greater than about 1.7 mm, not greater than about 1.6 mm, or even not greater than about 1.5 mm It will be appreciated that the anode bulk layer 210 can have an average thickness within a range including any of the minimum and maximum values noted above.

In a particular embodiment, each of the layers illustrated in FIG. 2 can be formed separately as green layers and assembled together. Alternatively, the layers may be formed in green state in succession on each other. Reference herein to "green" articles is reference to materials that have not undergone sintering to affect densification or grain growth. A green article is an unfinished article that may be dried and have low water content, but is unfired. A green article can have suitable strength to support itself and other green layers formed thereon.

The interconnect layer 202 may include a lanthanum strontium titanate (LST) material. For example, the interconnect layer 202 may include a doped LST material, such as, $La_{0.2}Sr_{0.8}TiO_3$, having one or more dopants. In a particular embodiment, the LST material may be a niobium doped lanthanum strontium titanate (LSTN) material. For example, the LSTN material may have a niobium dopant content that is not less than about 0.01 mol %, not less than about 1 mol %, not less than about 2 mol %, or not less than about 3 mol %.

As another example, the LSTN material may have a niobium dopant content that is not greater than about 17 mol %, such as not greater than about 16 mol %, not greater than about 15 mol %, not greater than about 14 mol %, not greater than about 13 mol %, or even not greater than about 12 mol %. It will be appreciated that the niobium dopant content can be within a range including any of the minimum and maximum values noted above. In an illustrative non-limiting embodiment, the niobium dopant content is about 8 mol % (4 mol % $Nb_2O_5$ doped LST, LSTN 4.0).

The interconnect layer 202 can be a particularly thin, planar layer of material. For example, the interconnect layer 202 may have an average thickness that is not greater than about 100 µm, such as not greater than about 90 µm, not greater than about 80 µm, not greater than about 70 µm, not greater than about 60 µm, or even not greater than about 50 µm. Further, the interconnect layer 202 may have an average thickness that is not less than about 5 µm, not less than about 6 µm, not less than about 7 µm, not less than about 8 µm, not less than about 9 µm, or even not less than about 10 µm. It will be appreciated that the interconnect layer 202 can have an average thickness within a range between any of the minimum and maximum values noted above.

The interconnect layer 202 can be formed from a powder interconnect material having a particular particle size that facilitates formation of the interconnect cell 200 according to the embodiments herein. For example, the powder interconnect material can have an average particle size of less than about 100 microns, such as less than about 50 microns, less than about 20 microns, less than about 10 microns, less than about 5 microns, or even less than about 1 micron. Still, in particular instances, the average particle size of the powder interconnect material can be at least about 0.01 microns, at least about 0.05 microns, at least about 0.08 microns, at least about 0.1 microns, at least about 0.2 microns, or even at least about 0.4 microns. It will be appreciated that the powder interconnect material can have an average particle size within a range including any of the minimum and maximum values noted above.

Materials for the cathode bulk layer 208 generally include lanthanum manganate materials. Particularly, the cathode can be made of a doped lanthanum manganate material, giving the cathode composition a perovskite type crystal structure. Accordingly, the doped lanthanum manganate material has a general composition represented by the formula, $(La_{1-x}A_x)_y MnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr. According to a particular embodiment, the dopant is Sr, and the cathode bulk layer 208 may include a lanthanum strontium manganate material, known generally as LSM. In an exemplary embodiment, the cathode bonding layer 204 may include an LSM material and yttria stabilized zirconia. Coarse particles in the bonding layers may have a puncturing effect. As such, a green LSM powder that is substantially free of coarse particles may be used to form the cathode bonding layer 204. As an illustrative example, substantially all (i.e., 99 vol %) of the LSM particles of the green LSM powder may have a particle size diameter that is less than 10 µm.

Referring to the stoichiometry of the doped lanthanum manganate cathode material, according to one embodiment, parameters such as the type of atoms present, the percentage of vacancies within the crystal structure, and the ratio of atoms, particularly the ratio of La/Mn within the cathode material, are provided to manage the formation of conductivity-limiting compositions at the cathode/electrolyte interface during the operation of the fuel cell. The formation of conductivity-limiting compositions reduces the efficiency of the cell and reduces the lifetime of the SOFC. According to one embodiment, the doped lanthanum manganate cathode material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganate composition represents the amount of dopant substituted for La within the structure. In further reference to the stoichiometry of the cathode, the value of y in the general formula $(La_{1-x}A_x)_yMnO_{3-\delta}$ represents the percent occupancy of atoms on the A-site within the crystal lattice. Thought of another way, the value of y may also be subtracted from 1.0 and represent the percentage of vacancies on the A-site within the crystal lattice. For the purposes of this disclosure, a doped lanthanum manganate material having a value of y less than 1.0 is termed an "A-site deficient" structure, since the A-sites within the crystal structure are not 100% occupied.

In a particular embodiment, the dopant material is Sr (an LSM cathode), such that the cathode composition is $(La_{1-x}Sr_x)_yMnO_{3-\delta}$, where x is not greater than about 0.5, such as not greater than about 0.4, 0.3, 0.2 or even not greater than about 0.1, and particularly within a range of between about 0.3 and 0.05. In a particular embodiment, the value of y is not greater than about 1.0. In an illustrative non-limiting embodiment, x is about 0.2 and y is about 0.98, such that the cathode bulk layer 208 includes an LSM material with a composition of $(La_{0.8}Sr_{0.2})_{0.98}MnO_3$. A cathode having an A-site deficient, doped lanthanum manganate composition, as provided in the previously described embodiments, may reduce the formation of conductivity-limiting compositions at the cathode/electrolyte interface during the operation of the fuel cell.

In a particular embodiment, the anode bulk layer 210 may include a cermet material, that is, a combination of a ceramic and metallic material. For example, the anode bulk layer 210 may be formed with nickel and YSZ. The nickel is generally produced through the reduction of nickel oxide included in the anode precursor, such as a green ceramic composition that is heat-treated. That is, the anode bulk layer 210 may include a nickel oxide and YSZ (before reduction) or nickel and YSZ (after reduction). The anode bonding layer 206 may also include a nickel oxide and YSZ (before reduction) or nickel and YSZ (after reduction). Coarse particles in the bonding layers may have a puncturing effect. As such, a green NiO powder that is substantially free of coarse particles may be used to form the anode bonding layer 206. As an illustrative example, substantially all (i.e., 99 vol %) of the NiO particles of the green NiO powder may have a particle size diameter that is less than 10 μm. In a particular embodiment, the YSZ powder that is included in the material that is used to form the anode bonding layer 206 may have a different particle size distribution than the YSZ powder that is included in the material that is used to form the anode bulk layer 210.

EXAMPLES

Electrochemical testing was performed for interconnect cells with bonding layers formed from YSZ powders with different PSD types. The particle sizes can be obtained by laser scattering measurements with, for example, a Partica LA-950 laser from Horiba (Horiba Instruments, Inc., Irvine, Calif.).

Example 1

An "18-5" YSZ powder (available from Saint-Gobain Corp.) was selected for testing. The 18-5 YSZ powder has a bimodal PSD type with a $d_{10}$ of 0.71 μm, a $d_{50}$ of 3.66 μm, a $d_{90}$ of 9.31 μm, and a specific surface area (SSA) of 1.2 m$^2$/g.

A green interconnect cell was sintered to form an integrated, densified interconnect cell. Referring to FIG. 2 for illustrative purposes, the cathode bulk layer 208 included an LSM material with a composition of $(La_{0.8}Sr_{0.2})_{0.98}MnO_3$ with a thickness of about 1350 μm. The anode bulk layer 210 included nickel oxide and YSZ and had a thickness of about 1350 μm. The interconnect layer 202 included one "layer" of LSTN 4.0 with a total thickness of about 11 μm.

The cathode bonding layer 204 was formed from the 18-5 YSZ powder and an LSM powder with a composition of $(La_{0.8}Sr_{0.2})_{0.98}MnO_3$, having a $d_{10}$ of 0.58 μm, a $d_{50}$ of 1.38 μm, a $d_{90}$ of 2.69 μm, and an SSA of 4.23 m$^2$/g. The composition of the green cathode bonding layer prior to sintering included 36.70 wt % LSM, 55.05 wt % YSZ, and 8.25 wt % carbon black (c-black as a pore former during sintering). The integrated, densified cathode bonding layer 204 had a thickness of about 25 μm.

The anode bonding layer 206 was formed from the 18-5 YSZ powder and a nickel oxide powder with a $d_{10}$ of 0.46 μm, a $d_{50}$ of 0.74 μm, a $d_{90}$ of 1.50 μm, and an SSA of 3.43 m$^2$/g. The composition of the green anode bonding layer prior to sintering included 42.0 wt % NiO and 58.0 wt % YSZ. The integrated, densified anode bonding layer 206 had a thickness of about 25 μm.

Figure 3A:
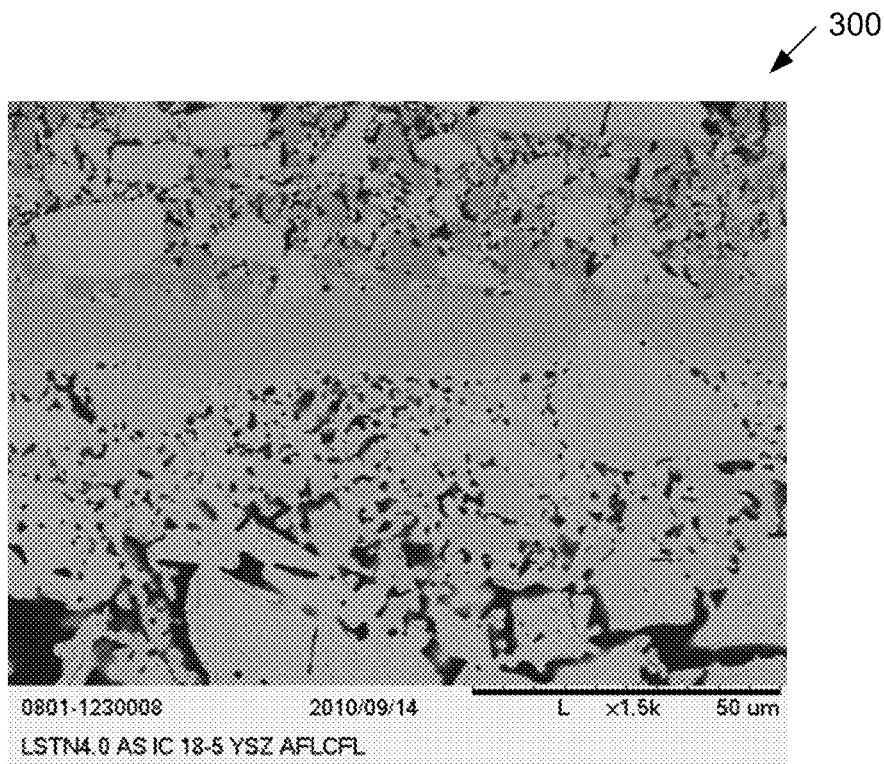
FIG. 3A is a cross-sectional SEM image of an interconnect cell that includes bonding layers formed from a first bimodal YSZ powder, prior to electrochemical testing.

Referring to FIG. 3A, an SEM cross-sectional image 300 illustrates the integrated, densified interconnect cell prior to electrochemical ("E-chem") testing.

The E-chem testing included heating the interconnect cell to a designed high temperature such as 800° C. and then holding at the high temperature for a designed period with passing fuel (H$_2$) in the anode side and oxidant (air) in the cathode side. The NiO in the anode bulk layer and the anode bonding layer is reduced into metallic Ni by the H$_2$ during heating and holding. A constant current density (such as 0.3A/cm$^2$) was applied into the interconnect cell by two conductive wires (two probes) and two additional conductive wires (two more probes) were used to measure the voltage of the interconnect cell generated by the applied current. This is so called 4-probe method of measuring the resistance. Then the cell resistance and therein the ASR (ohms cm$^2$) can be calculated with the Ohm equation and the interconnect cell active area. The ASR value over time can be dynamically monitored during the long term testing as long as the current is being applied, in order to determine ASR degradation.

Figure 3B:
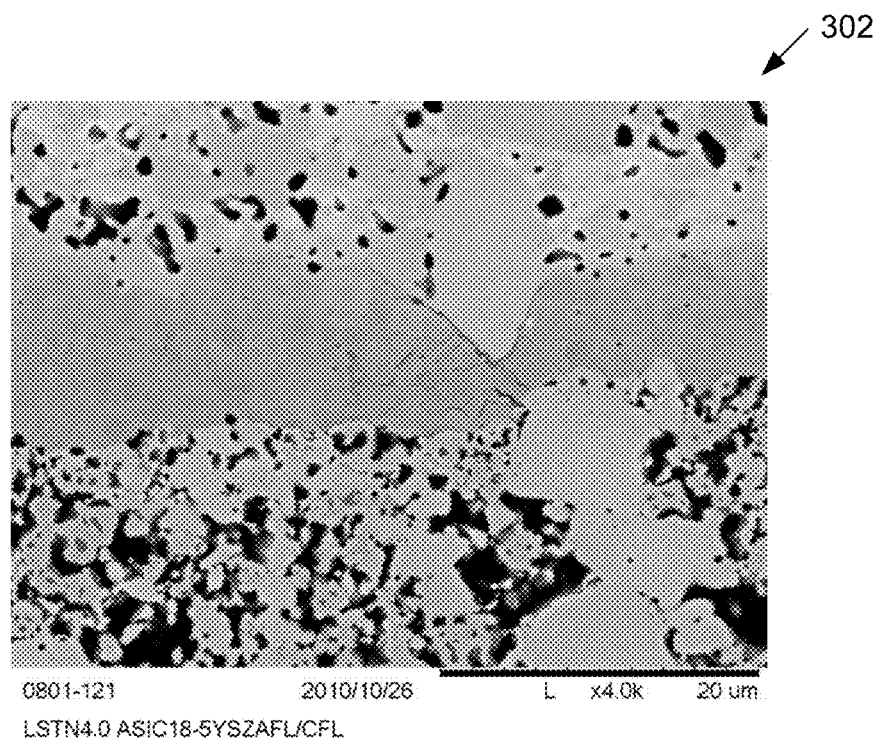
FIG. 3B is a cross-sectional SEM image of the interconnect cell of FIG. 3A after electrochemical testing, illustrating puncturing effects and resulting interconnect cracking.

Referring to FIG. 3B, an SEM cross-sectional image 302 illustrates the integrated, densified interconnect cell of FIG. 3A after electrochemical testing. For short term testing, only the initial ASR was measured then the interconnect cell was cooled down to room temperature (usually the test would take only about two days). The image 302 illustrates the puncturing effect from the coarse particles of the 18-5 YSZ powder and associated interconnect cracking.

Example 2

A "15-2R2" YSZ powder (available from Saint-Gobain Corp.) was selected for testing. The 15-2R2 YSZ powder has a bimodal PSD type with a $d_{10}$ of 0.62 µm, a $d_{50}$ of 2.62 µm, a $d_{90}$ of 9.56 µm, and a specific surface area (SSA) of 1.93 m²/g.

A green interconnect cell was sintered to form an integrated, densified interconnect cell. Referring to FIG. 2 for illustrative purposes, the cathode bulk layer 208 included an LSM material with a composition of $(La_{0.8}Sr_{0.2})_{0.98}MnO_3$ with a thickness of about 1400 µm. The anode bulk layer 210 included nickel oxide and YSZ and had a thickness of about 1400 µm. The interconnect layer 202 included one or two "layers" of LSTN 4.0 with a total thickness of about 27 µm.

The cathode bonding layer 204 was formed from the 15-2R2 YSZ powder and an LSM powder with a composition of $(La_{0.8}Sr_{0.2})_{0.98}MnO_3$, having a $d_{10}$ of 0.58 µm, a $d_{50}$ of 1.38 µm, a $d_{90}$ of 2.69 µm, and an SSA of 4.23 m²/g. The composition of the green cathode bonding layer prior to sintering included 36.70 wt % LSM, 55.05 wt % YSZ, and 8.25 wt % carbon black (c-black as a pore former during sintering). The integrated, densified cathode bonding layer 204 had a thickness of about 25 µm.

The anode bonding layer 206 was formed from the 15-2R2 YSZ powder and a nickel oxide powder with a $d_{10}$ of 0.46 µm, a $d_{50}$ of 0.74 µm, a $d_{90}$ of 1.50 µm, and an SSA of 3.43 m²/g. The composition of the green anode bonding layer prior to sintering included 42.0 wt % NiO and 58.0 wt % YSZ. The integrated, densified anode bonding layer 206 had a thickness of about 25 µm.

Figure 4:
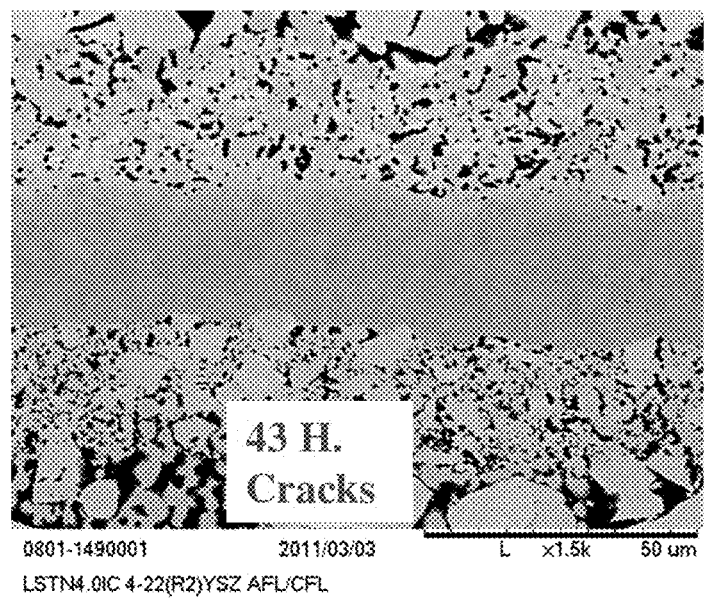
FIG. 4 is a cross-sectional SEM image of an interconnect cell formed from a second bimodal YSZ powder, showing interconnect cracking after long term testing.

The interconnect cell was then subjected to electrochemical testing (as described above in Example 1) over a time period of 1400 hours. Referring to FIG. 4, an SEM cross-sectional image 400 illustrates the integrated, densified interconnect cell after long term testing. FIG. 4 illustrates interconnect cracking, with 43 horizontal cracks identified in the image 400, and the puncturing effect from the coarse particles.

Figure 5:
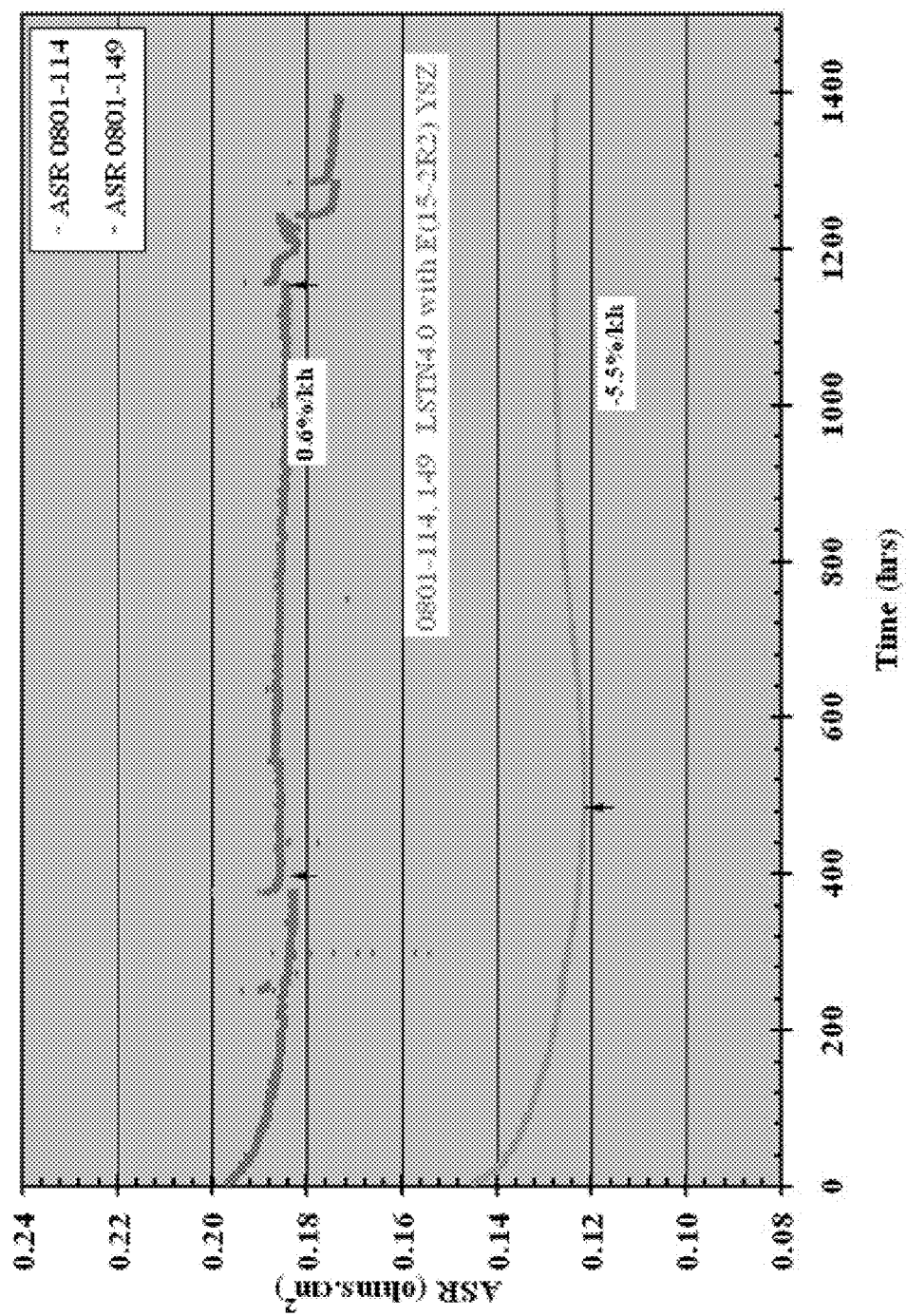
FIG. 5 illustrates the area specific resistance (ASR) (ohms.cm$^2$) over the course of the long term testing of the interconnect cell formed from the second bimodal YSZ powder.

FIG. 5 illustrates the results of long term testing of the area specific resistance (ASR) (ohms cm²) of the interconnect cells with bonding layers formed from the 15-2R2 powder. As illustrated in FIG. 5, one interconnect cell with a thin interconnect layer (13 µm) reached a Steady State ASR within about 500 hours after the start of testing. After reaching the Steady State ASR at about 500 hours, the ASR degraded at a rate of 5.5%/kh; The ASR of another interconnect cell with a thick interconnect layer (27 µm) was continuously decreased up to 1200 hrs.

Example 3

A "17-168" YSZ powder (available from Saint-Gobain Corp.) was selected for testing. The 17-168 YSZ powder has a monomodal PSD type with a $d_{10}$ of 0.45 µm, a $d_{50}$ of 0.77 µm, a $d_{90}$ of 1.5 µm, and a specific surface area (SSA) of 4.32 m²/g.

A green interconnect cell was sintered to form an integrated, densified interconnect cell. Referring to FIG. 2 for illustrative purposes, the cathode bulk layer 208 included an LSM material with a composition of $(La_{0.8}Sr_{0.2})_{0.98}MnO_3$ with a thickness of about 1400 µm. The anode bulk layer 210 included nickel oxide and YSZ and had a thickness of about 1400 µm. The interconnect layer 202 included one or two "layers" of LSTN 4.0 with a total thickness of about 13 or 27 µm.

The cathode bonding layer 204 was formed from the 17-168 YSZ powder and an LSM powder with a composition of $(La_{0.8}Sr_{0.2})_{0.98}MnO_3$, having a $d_{10}$ of 0.58 µm, a $d_{50}$ of 1.38 µm, a $d_{90}$ of 2.69 µm, and an SSA of 4.23 m²/g. The composition of the green cathode bonding layer prior to sintering included 36.70 wt % LSM, 55.05 wt % YSZ, and 8.25 wt % carbon black (c-black as a pore former during sintering). The integrated, densified cathode bonding layer 204 had a thickness of about 25 µm.

The anode bonding layer 206 was formed from the 17-168 YSZ powder and a nickel oxide powder with a $d_{10}$ of 0.46 µm, a $d_{50}$ of 0.74 µm, a $d_{90}$ of 1.50 µm, and an SSA of 3.43 m²/g. The composition of the green anode bonding layer prior to sintering included 42.0 wt % NiO and 58.0 wt % YSZ. The integrated, densified anode bonding layer 206 had a thickness of about 25 µm.

Figure 6:
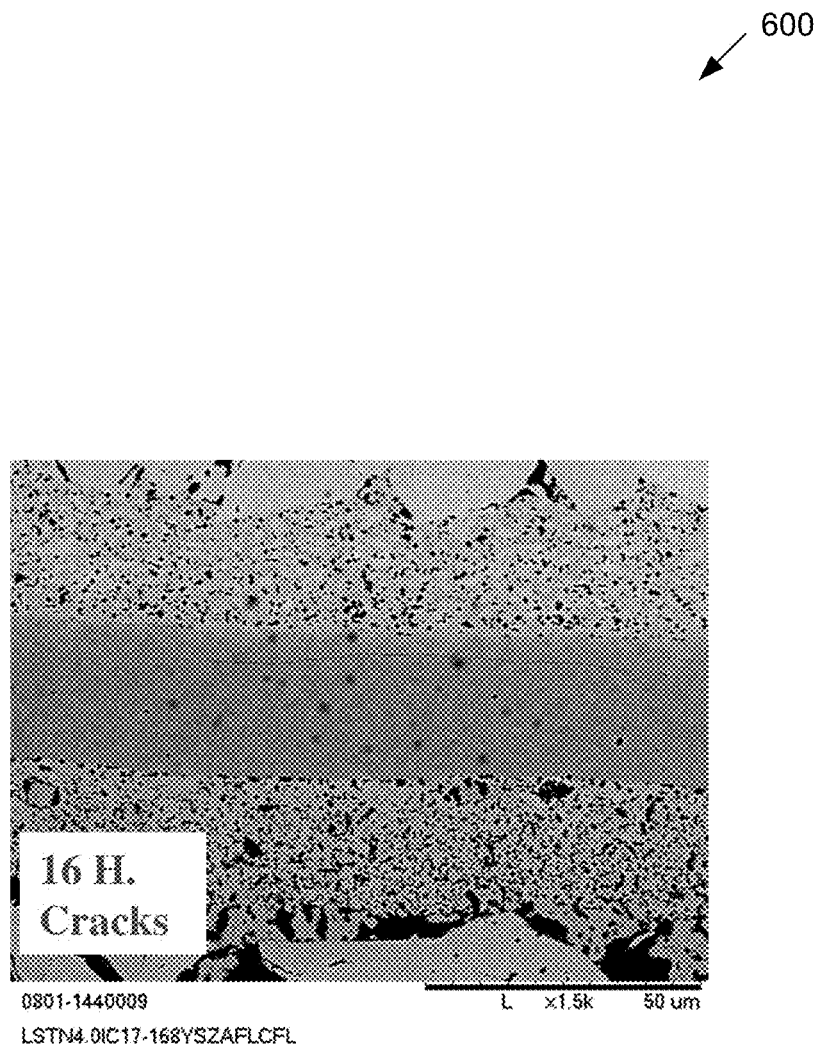
FIG. 6 is a cross-sectional SEM image of an interconnect cell formed from a first monomdal YSZ powder, showing interconnect cracking after long term testing.

The interconnect cell was then subjected to electrochemical testing (as described above in Example 1) over a time period of 1000 hours. Referring to FIG. 6, an SEM cross-sectional image 600 illustrates the integrated, densified interconnect cell after long term testing. FIG. 6 illustrates interconnect cracking, with 16 horizontal cracks identified in the image 600.

Figure 7:
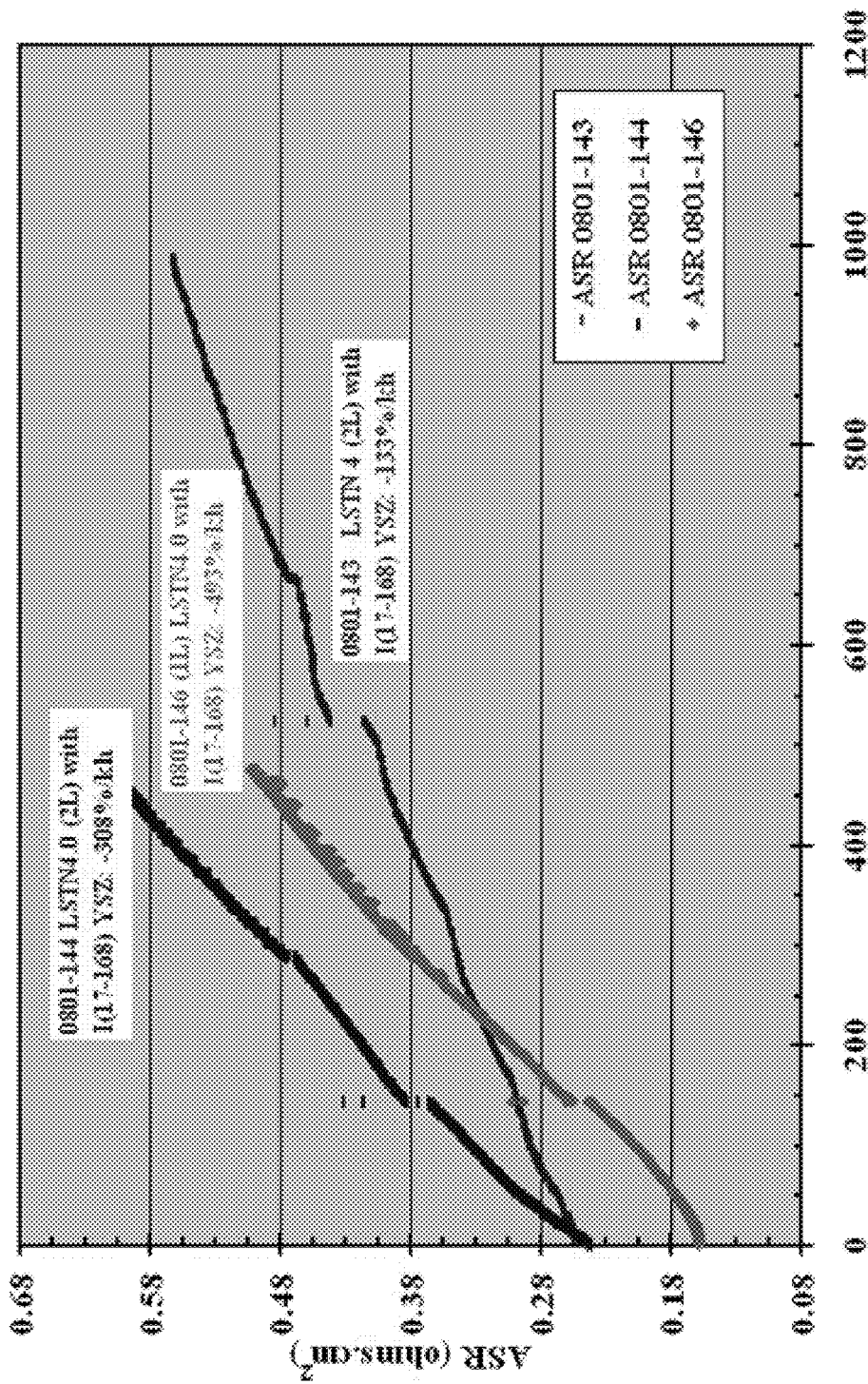
FIG. 7 illustrates the area specific resistance (ASR) (ohms.cm$^2$) over the course of the long term testing of the interconnect cell formed from the first monomodal YSZ powder.

FIG. 7 illustrates the results of long term testing of the area specific resistance (ASR) (ohms cm²) of the interconnect cells with bonding layers formed from the 17-168 powder. As illustrated in FIG. 7, the interconnect cells exhibited rapid ASR degradation substantially immediately after the start of testing. The ASR degraded at a rate of 133%/kh, 308%/kh and 493%/kh, respectively.

Example 4

A "16-191" YSZ powder (available from Saint-Gobain Corp.) was selected for testing. The 16-191 YSZ powder has a monomodal PSD type with a $d_{10}$ of 0.45 µm, a $d_{50}$ of 0.84 µm, a $d_{90}$ of 1.65 µm, and a specific surface area (SSA) of 4.59 m²/g.

A green interconnect cell was sintered to form an integrated, densified interconnect cell. Referring to FIG. 2 for illustrative purposes, the cathode bulk layer 208 included an LSM material with a composition of $(La_{0.8}Sr_{0.2})_{0.98}MnO_3$ with a thickness of about 1350 µm. The anode bulk layer 210 included nickel oxide and YSZ and had a thickness of about 1350 µm. The interconnect layer 202 included two "layers" of LSTN 4.0 with a total thickness of about 27 µm.

The cathode bonding layer 204 was formed from the 16-191 YSZ powder and an LSM powder with a composition of $(La_{0.8}Sr_{0.2})_{0.98}MnO_3$, having a $d_{10}$ of 0.58 µm, a $d_{50}$ of 1.38 µm, a $d_{90}$ of 2.69 µm, and an SSA of 4.23 m²/g. The composition of the green cathode bonding layer prior to sintering included 36.70 wt % LSM, 55.05 wt % YSZ, and 8.25 wt % carbon black (c-black as a pore former during sintering). The integrated, densified cathode bonding layer 204 had a thickness of about 25 µm.

The anode bonding layer 1206 was formed from the 16-191 YSZ powder and a nickel oxide powder with a $d_{10}$ of 0.46 µm, a $d_{50}$ of 0.74 µm, a $d_{90}$ of 1.50 µm, and an SSA of 3.43 m²/g. The composition of the green anode bonding layer prior to sintering included 42.0 wt % NiO and 58.0 wt % YSZ. The integrated, densified anode bonding layer 206 had a thickness of about 25 µm.

Figure 8:
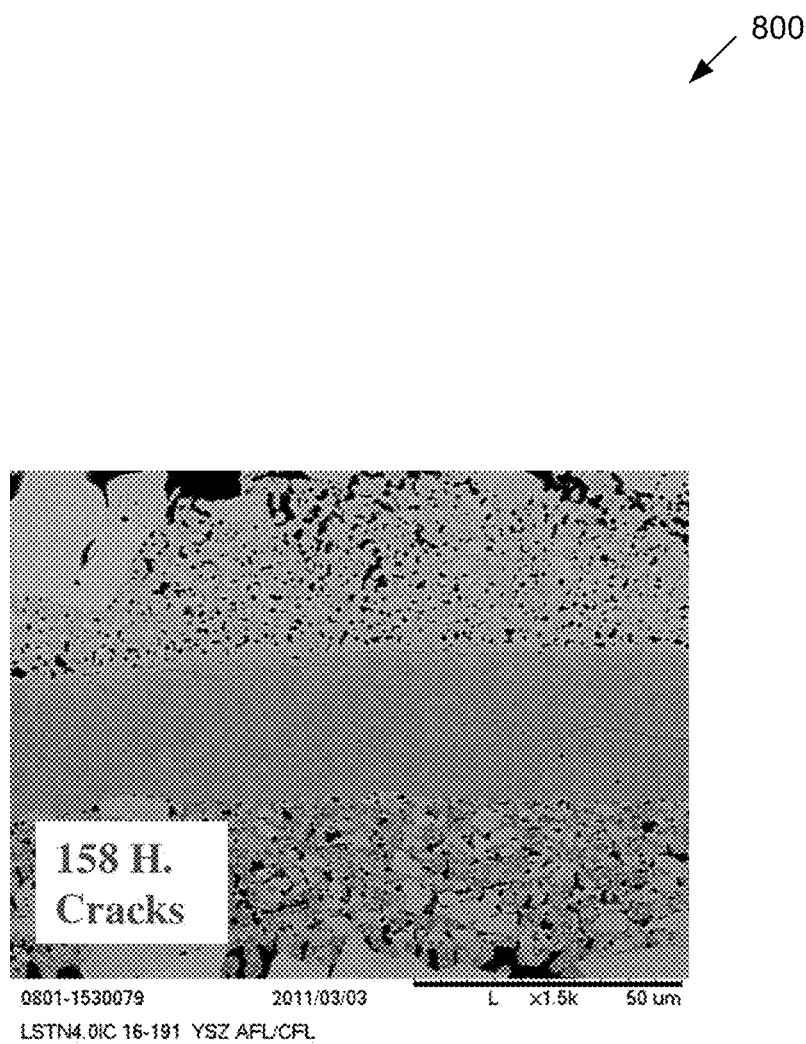
FIG. 8 is a cross-sectional SEM image of an interconnect cell formed from a second monomdal YSZ powder, showing interconnect cracking after long term testing.

The SOFC stack including the interconnect cell was then subjected to electrochemical testing (as described above in Example 1) over a time period of 1000 hours. Referring to FIG. 8, an SEM cross-sectional image 800 illustrates the integrated, densified interconnect cell after long term testing. FIG. 8 illustrates interconnect cracking, with 158 horizontal cracks identified in the image 800.

Figure 9:
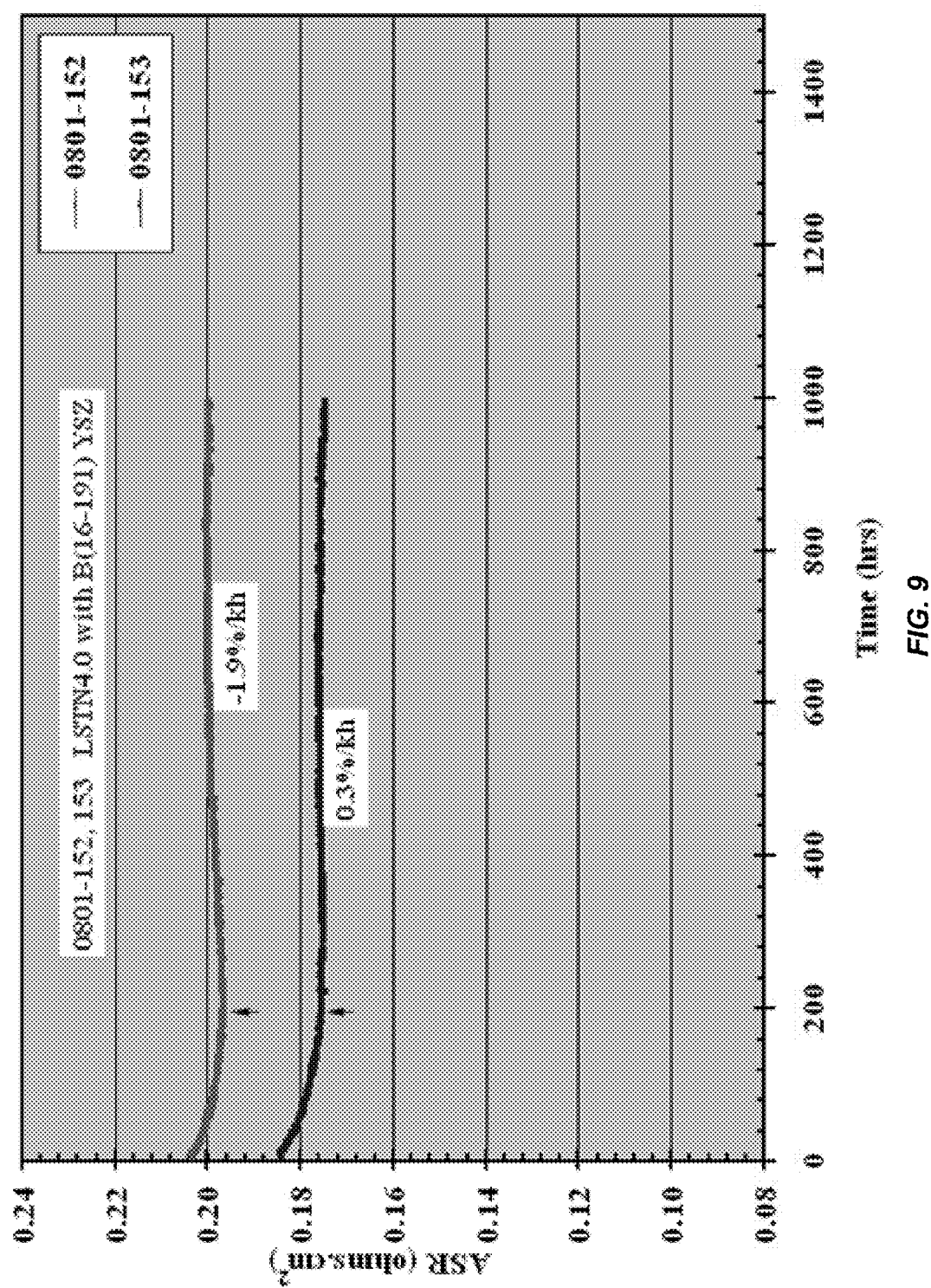
FIG. 9 illustrates the area specific resistance (ASR) (ohms.cm$^2$) over the course of the long term testing of the interconnect cell formed from the second monomdal YSZ powder.

FIG. 9 illustrates the results of long term testing of the area specific resistance (ASR) (ohms cm²) of the interconnect cell with bonding layers formed from the 16-191 powder. As illustrated in FIG. 9, the interconnect cell reached a Steady State ASR within about 200 hours after the start of testing. After reaching the Steady State ASR at about 200 hours, the ASR degraded at a rate of about 1.9%/kh.

Example 5

A YSZ powder (the "18-48" YSZ powder) was selected for testing, the 18-48 YSZ powder having a monomodal PSD type with a $d_{10}$ of 0.84 µm, a $d_{50}$ of 2.14 µm, a $d_{90}$ of 4.3 µm, and a specific surface area (SSA) of 1.69 m²/g.

Figure 10:
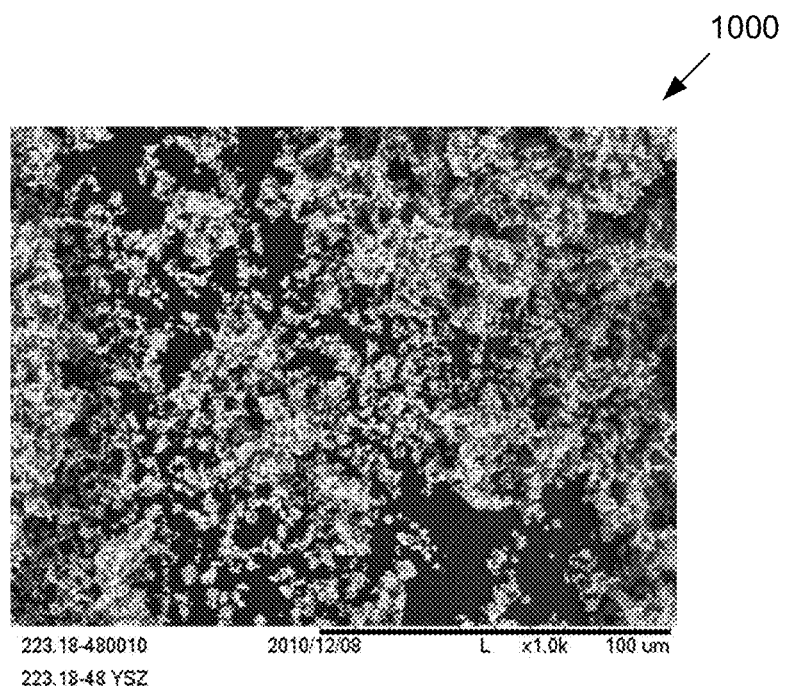
FIG. 10 is an SEM image of an exemplary YSZ powder that may be utilized for formation of a bonding layer according to an embodiment.
Figure 11:
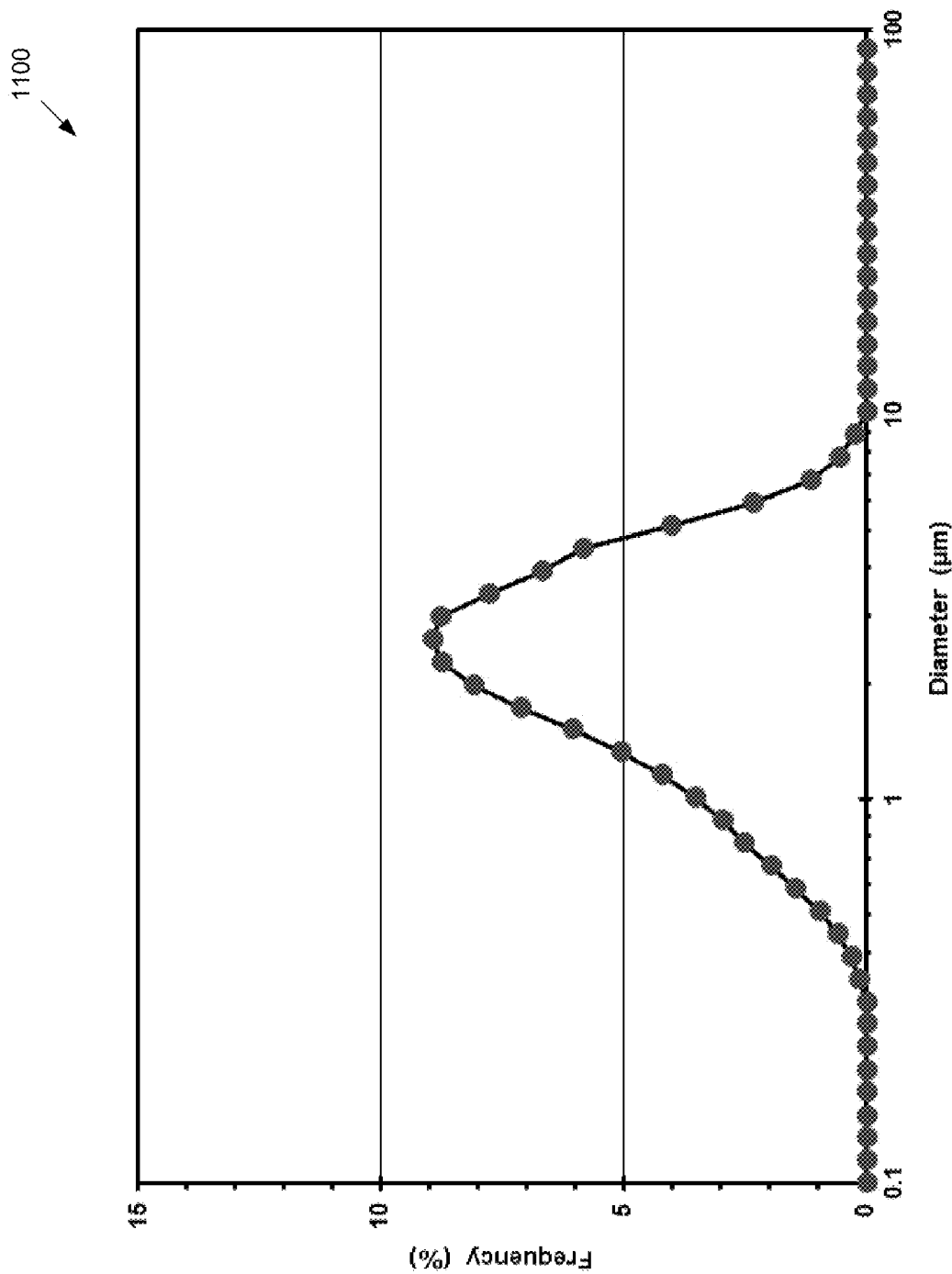
FIG. 11 illustrates the particle size distribution of the exemplary YSZ powder of FIG. 10.

FIG. 10 is an SEM image 1000 of the exemplary 18-48 YSZ powder, and FIG. 11 is a graph that illustrates the particle size distribution of the exemplary 18-48 YSZ powder of FIG. 10. Further details of the particle size distribution of the exemplary 18-48 YSZ powder are included in Table 1.

TABLE 1

| Diameter | Frequency % | Oversize % |
|---|---|---|
| 0.296 | 0 | 0 |
| 0.339 | 0.151 | 0.151 |
| 0.389 | 0.305 | 0.456 |
| 0.445 | 0.569 | 1.025 |
| 0.51 | 0.962 | 1.986 |
| 0.584 | 1.467 | 3.454 |
| 0.669 | 1.952 | 5.406 |
| 0.766 | 2.512 | 7.918 |
| 0.877 | 2.966 | 10.884 |
| 1.005 | 3.529 | 14.413 |
| 1.151 | 4.215 | 18.628 |
| 1.318 | 5.061 | 23.689 |
| 1.51 | 6.063 | 29.751 |
| 1.729 | 7.114 | 36.865 |
| 1.981 | 8.101 | 44.966 |
| 2.269 | 8.761 | 53.727 |
| 2.599 | 8.948 | 62.675 |
| 2.976 | 8.771 | 71.446 |
| 3.409 | 7.773 | 79.219 |
| 3.905 | 6.684 | 85.903 |
| 4.472 | 5.825 | 91.728 |
| 5.122 | 4.012 | 95.74 |
| 5.867 | 2.342 | 98.082 |
| 6.72 | 1.134 | 99.216 |
| 7.697 | 0.549 | 99.765 |
| 8.816 | 0.235 | 100 |
| 10.097 | 0 | 100 |

Figure 12:
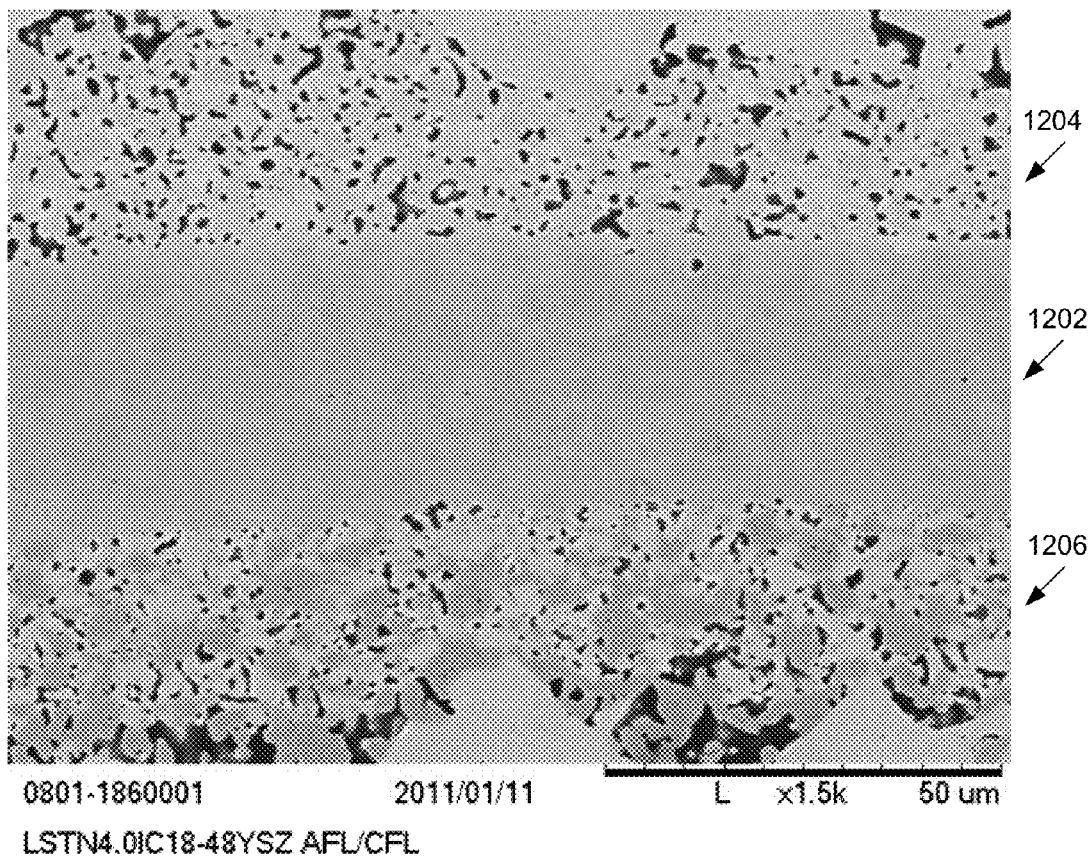
FIG. 12 is a cross-sectional SEM image of an interconnect cell according to an embodiment. The bonding layers of the interconnect cell illustrated in FIG. 12 were formed from the exemplary YSZ powder of FIG. 10.

A green interconnect cell was sintered to form an integrated, densified interconnect cell. FIG. 12 is an SEM cross-sectional image that includes a portion of the integrated, densified interconnect cell. The cathode bulk layer included an LSM material with a composition of $(La_{0.8}Sr_{0.2})_{0.98}MnO_3$ with a thickness of about 1350 µm. The anode bulk layer included nickel oxide and YSZ and had a thickness of about 1350 µm. The interconnect layer 1202 included two "layers" of LSTN 4.0 with a total thickness of about 36 µm.

The cathode bonding layer 1204 was formed from the 18-48 YSZ powder and an LSM powder with a composition of $(La_{0.8}Sr_{0.2})_{0.98}MnO_3$, having a $d_{10}$ of 0.58 µm, a $d_{50}$ of 1.38 µm, a $d_{90}$ of 2.69 µm, and an SSA of 4.23 m²/g. The composition of the green cathode bonding layer prior to sintering included 36.70 wt % LSM, 55.05 wt % YSZ, and 8.25 wt % carbon black (c-black as a pore former during sintering). The integrated, densified cathode bonding layer 1204 had a thickness of about 25 µm.

The anode bonding layer 1206 was formed from the 18-48 YSZ powder and a nickel oxide powder with a $d_{10}$ of 0.46 µm, a $d_{50}$ of 0.74 µm, a $d_{90}$ of 1.50 µm, and an SSA of 3.43 m²/g. The cathode bonding layer 1204 had a thickness of about 25 µm. The composition of the green anode bonding layer prior to sintering included 42.0 wt % NiO and 58.0 wt % YSZ. The integrated, densified anode bonding layer 1206 had a thickness of about 25 µm.

FIG. 12 illustrates that using the 18-48 YSZ powder to form the bonding layers 1204, 1206 results in microstructure and porosity that may improve performance of an SOFC stack.

The SEM image of FIG. 12 illustrates a microstructure with a substantially uniform thickness of the interconnect layer (IC), the cathode bonding layer (CBL), and the anode bonding layer (ABL). The microstructure further shows good bonding between the IC/ABL and IC/CBL, and a dense IC layer with substantially no defects such as crack free and no puncturing effect caused by the materials in the ABL and CBL. Further, the CBL and ABL have a good porosity, in the range of between 12 vol % and 40 vol % after reduction (ABL porosity will be increased after NiO is reduced to Ni).

A particular range of porosity (e.g., about 12 to 40 vol %) after reduction for both ABL and CBL may allow for high performance of an SOFC stack. Porosity in the ABL and CBL that is too high may cause poor bonding and poor contact between the IC/CBL and IC/ABL, resulting in a high ASR for the interconnect cell. Porosity in the ABL that is too low reduces the partial pressure of the fuel (e.g., $H_2$) in the interface of IC/ABL and ABL, slowing down or even preventing the NiO reduction in the ABL and the LSTN reduction (LSTN materials have a higher conductivity in reduced condition than in air condition since the reduction of $Ti^{4+}$ to $Ti^{3+}$ is favored under reduced condition). As a consequence, there is more $Ti^{3+}$ when tested under the reduced condition such as in $H_2$, which explains the higher conductivities of LSTN materials in fuel gas ($H_2$) than in air. Porosity in the CBL that is too low may reduce the partial pressure of the oxygen in the interface of IC/CBL and CBL, reducing the LSM phase stability and increasing the formation of conductivity-limiting compositions at the LSM/YSZ interface during the operation of the fuel cell.

With respect to porosity, using Image Analyzer software, the porosity of the cathode bonding layer 1204 was estimated to be 16% with a standard deviation of ±2.0%, and the porosity of the anode bonding layer 1206 was estimated to be 12.6% with a standard deviation of ±2.1% before NiO reduction.

Figure 13:
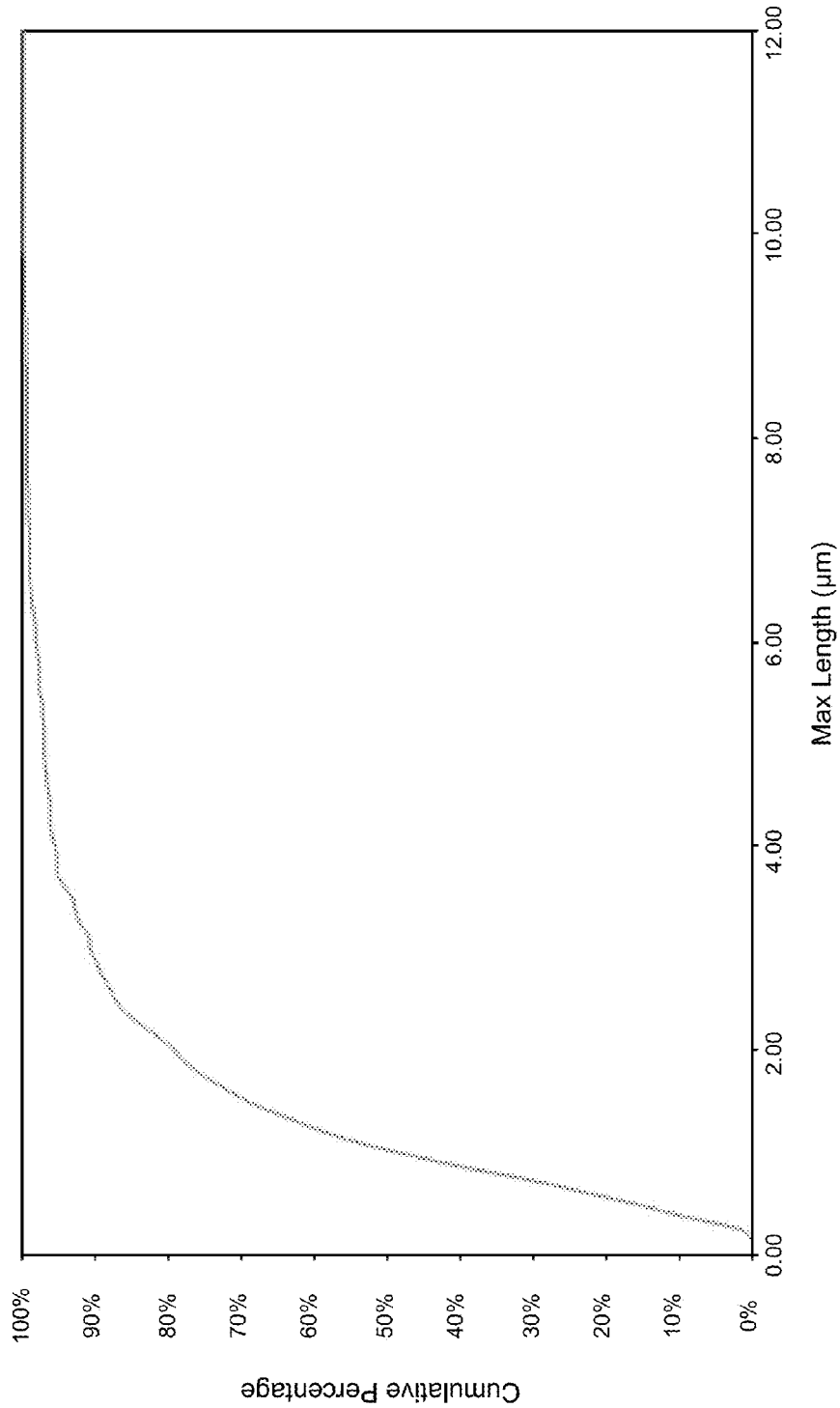
FIG. 13 illustrates the pore size distribution of the cathode bonding layer of the interconnect cell illustrated in FIG. 12.

FIG. 13 illustrates the pore size distribution of the cathode bonding layer 1204 prior to electrochemical testing. Specifically, FIG. 13 illustrates the frequency of occurrence of pores with a particular maximum length (in microns) in the cathode bonding layer 1204. The mean maximum length of a pore in the cathode bonding layer 1204 is 1.42 µm with a standard deviation of ±1.28 µm.

Figure 14:
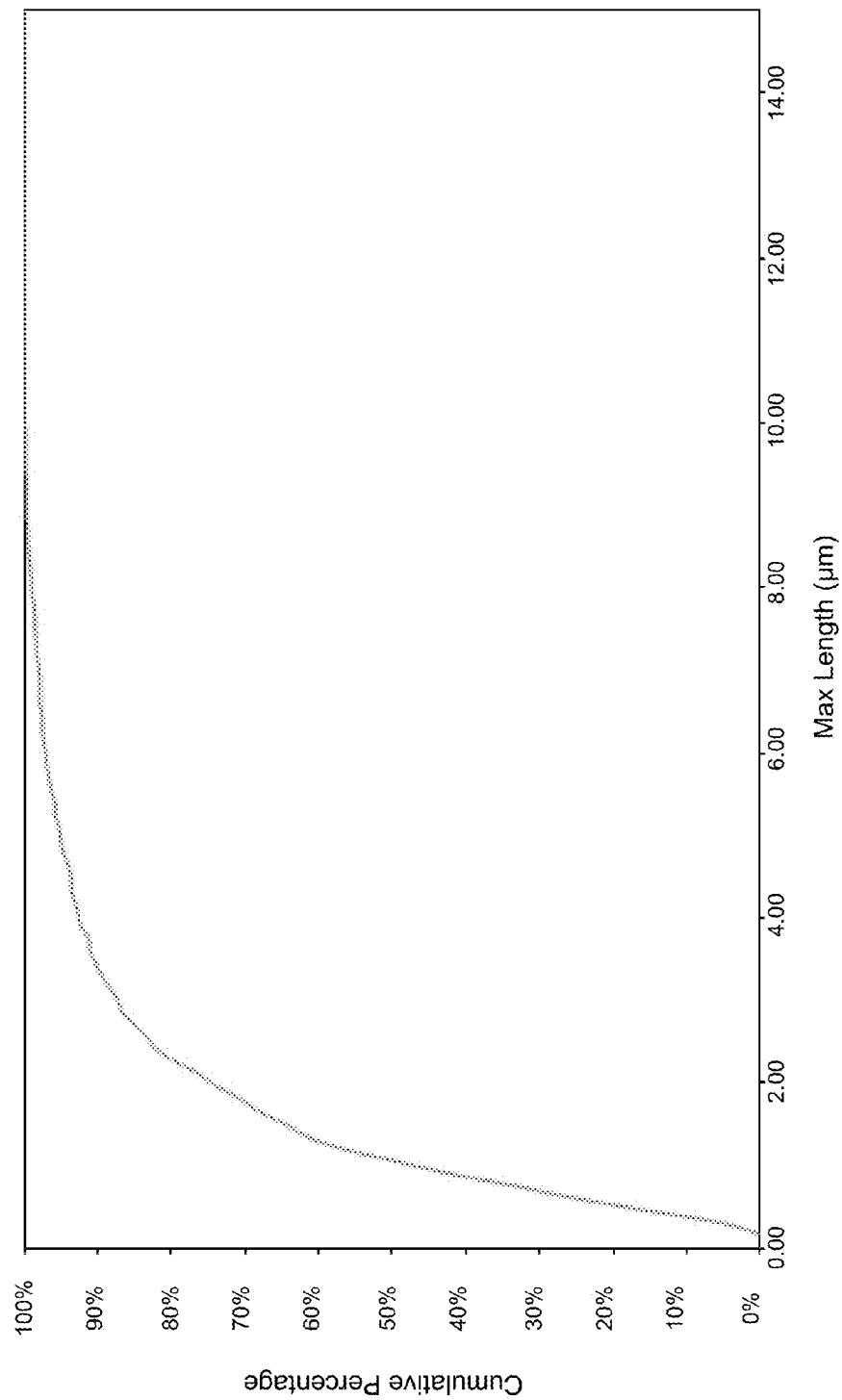
FIG. 14 illustrates the pore size distribution of the anode bonding layer of the interconnect cell illustrated in FIG. 12.

FIG. 14 illustrates the pore size distribution of the anode bonding layer 1206 prior to electrochemical testing. Specifically, FIG. 14 illustrates the frequency of occurrence of pores with a particular maximum length (in microns) in the anode bonding layer 1206. The mean maximum length of a pore in the anode bonding layer 1206 is 1.59 µm with a standard deviation of ±1.55 µm.

Figure 15:
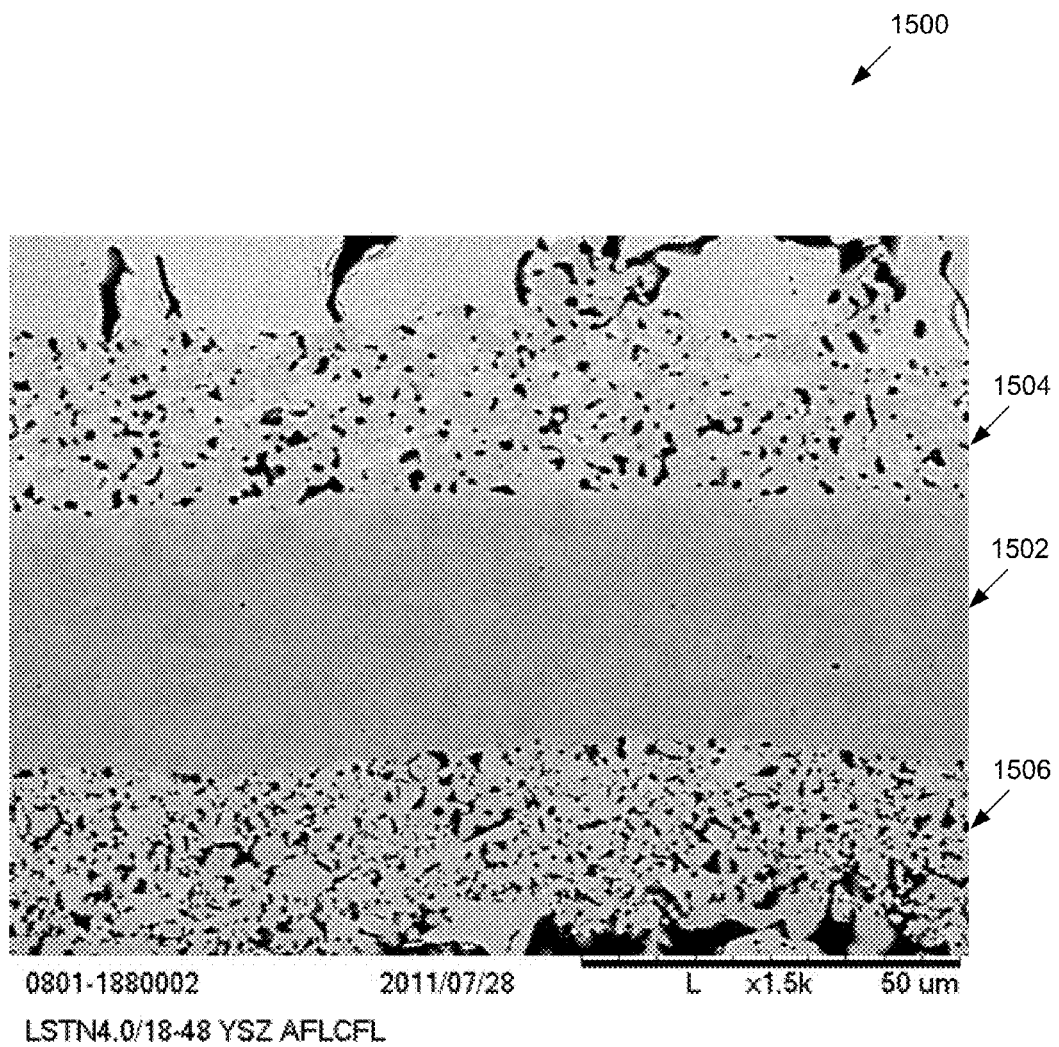
FIG. 15 is a cross-sectional SEM image of an interconnect cell according to an embodiment after long term testing, showing no interconnect cracking. The bonding layers of the interconnect cell illustrated in FIG. 15 were formed from the exemplary YSZ powder of FIG. 10.

An integrated, densified interconnect cell (with bonding layers formed from the exemplary YSZ powder of FIG. 10) was subjected to electrochemical testing (as described above in Example 1) over a time period of 3260 hours. FIG. 15 is an SEM cross-sectional image 1500 showing the interconnect cell after the long term testing. In FIG. 15, the interconnect layer is designated 1502 and the bonding layers are designated 1504 and 1506. After testing for 3260 hours, substantially no cracking was observed in the interconnect layer

1502. Further, there was no puncturing effect associated with coarse YSZ particles (See e.g. FIG. 3B) from either of the bonding layers 1504, 1506.

FIG. 15 illustrates that, after long term testing, an interconnect cell that includes bonding layers formed from a material that includes a YSZ powder having a monomodal PSD with a $d_{50}$ that is greater than 1 μm and a $d_{90}$ that is greater than 2 μm (e.g., the "18-48" YSZ powder of Example 5) may exhibit substantially no cracking of the interconnect layer.

Figure 16:
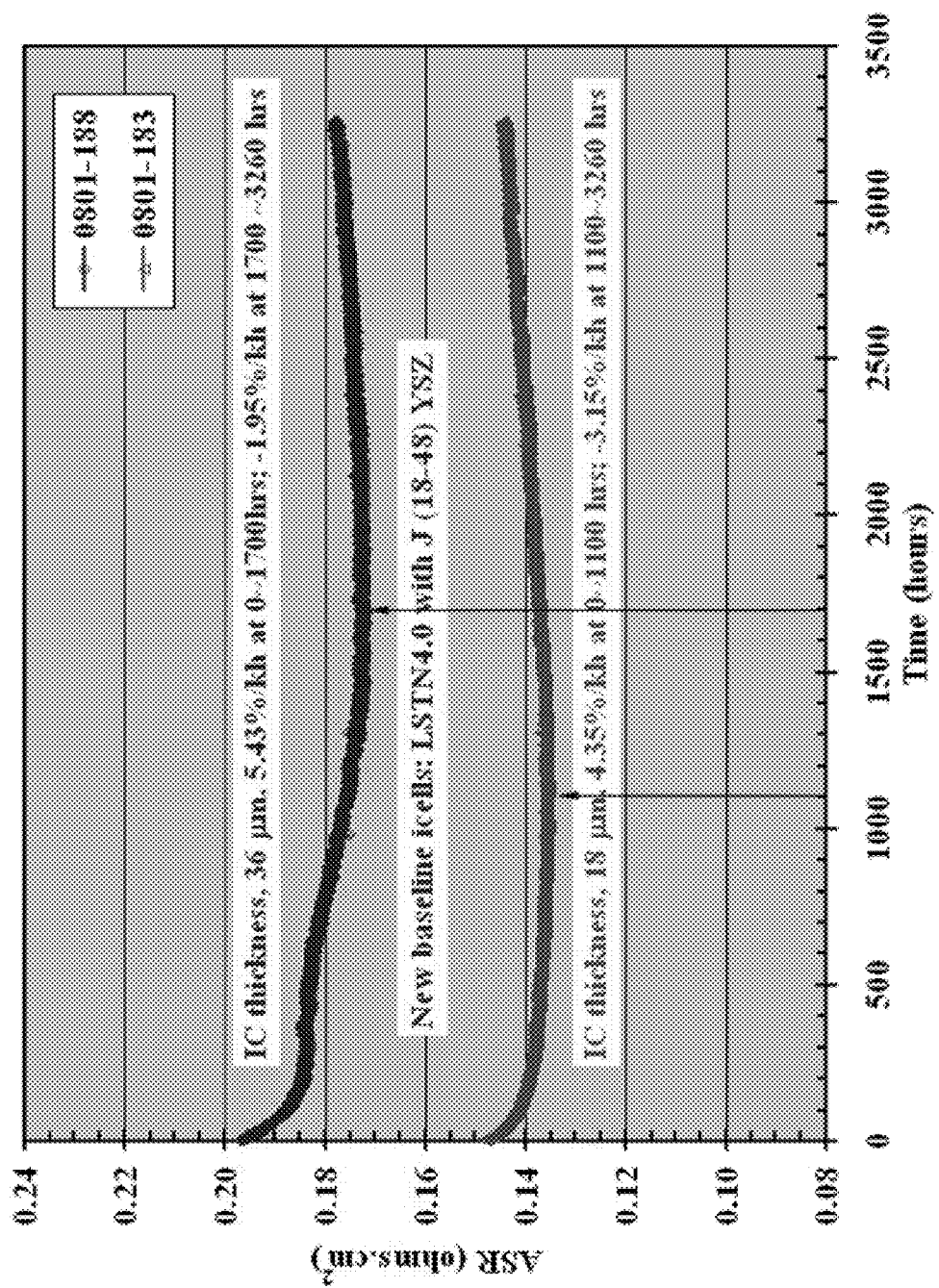
FIG. 16 illustrates the results of long term testing of the area specific resistance (ASR) (ohms.cm$^2$) of exemplary interconnect cells according to embodiments described herein.

FIG. 16 illustrates the results of long term electrochemical testing (as described above in Example 1) of the area specific resistance (ASR) of two exemplary interconnect cells.

FIG. 16 illustrates the ASR data associated with an interconnect cell with an interconnect layer that includes LSTN 4.0 with a thickness of about 36 μm (e.g., two "layers" of LSTN 4.0 with a thickness of 18 μm each). An interconnect cell with an interconnect layer having a thickness of about 36 μm corresponds to the interconnect cell 1500 illustrated in the SEM cross-sectional image of FIG. 15 (prior to ASR testing). As shown in FIG. 16, the interconnect cell reached a Steady State ASR within about 1700 hours after the start of testing. That is, the interconnect cell showed no ASR degradation for about the first 1700 hours of testing. Rather, the ASR decreased by about 5%/kh from between 0.18 and 0.20 Ohms $cm^2$ at the start of testing to between 0.16 and 0.18 Ohms $cm^2$ at about 1700 hours. After reaching the Steady State ASR at about 1700 hours, the ASR degraded at a rate of about 1.9%/kh over the time period from 1700 hours to 3260 hours.

FIG. 16 further illustrates the ASR data associated with an interconnect cell with an interconnect layer that includes LSTN 4.0 with a thickness of about 18 μm (e.g., one "layer" of LSTN 4.0 with a thickness of 18 μm). In this case, the interconnect cell reached a Steady State ASR within about 1100 hours after the start of testing. That is, the interconnect cell showed no ASR degradation for about the first 1100 hours of testing. Rather, the ASR decreased at a rate of about 4%/kh from between 0.14 and 0.16 Ohms $cm^2$ at the start of testing to between 0.12 and 0.14 Ohms $cm^2$ at about 1100 hours. After reaching the Steady State ASR at about 1100 hours, the ASR degraded at a rate of about 3%/kh over the time period from 1100 hours to 3260 hours.

In the embodiments illustrated in FIG. 16, both the anode bonding layer and the cathode bonding layer were formed from a material that includes the exemplary YSZ powder illustrated in FIG. 10. Thus, using a material that includes a YSZ powder with a monomodal PSD with a $d_{50}$ that is greater than 1 μm and a $d_{90}$ that is greater than 2 μm (e.g., the YSZ powder illustrated in FIG. 10) in a bonding layer may offer improved ASR performance.

Figure 17:
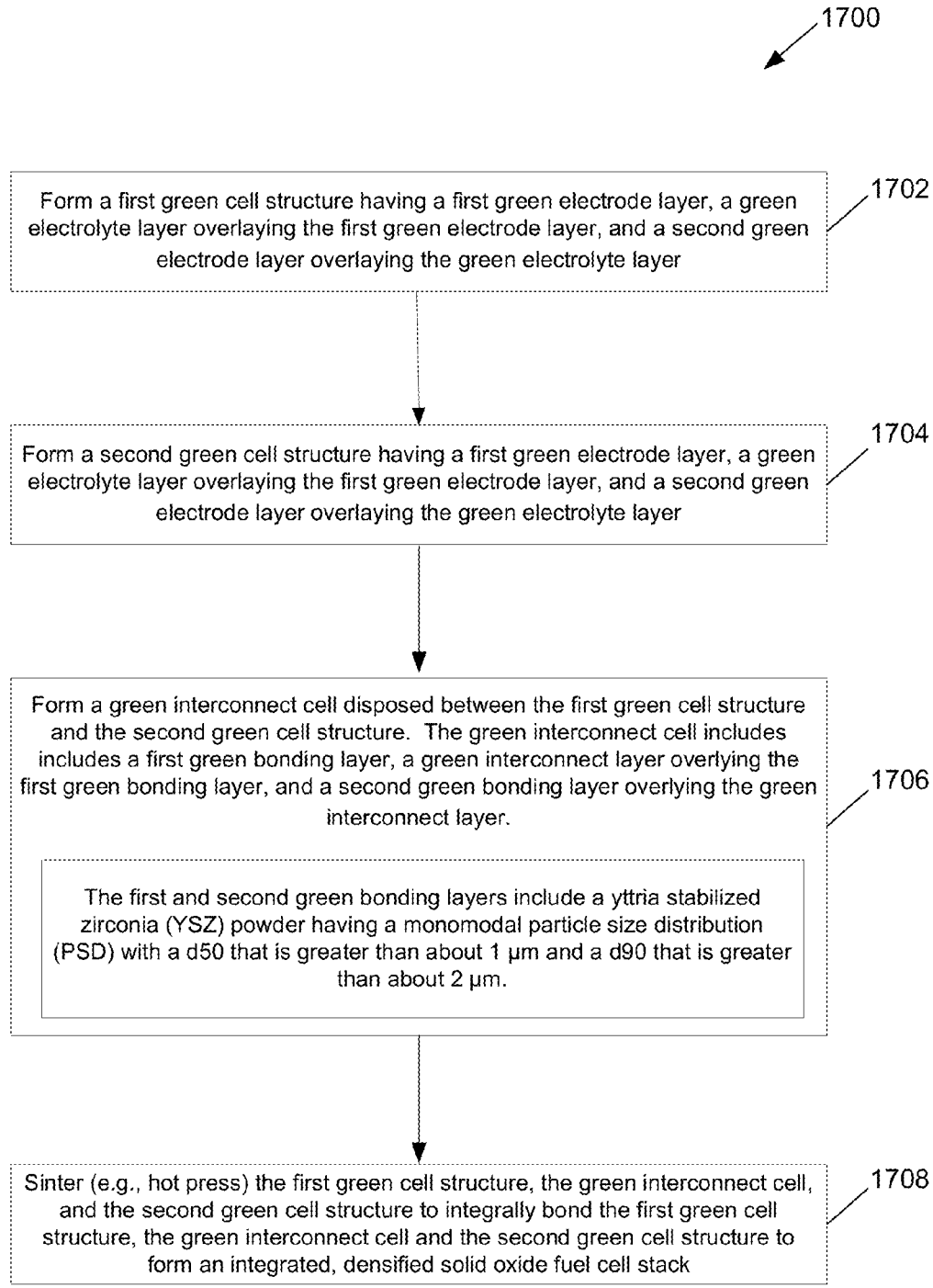
FIG. 17 illustrates a method of forming an integrated solid oxide fuel cell stack according to an embodiment.

Referring to FIG. 17, a particular embodiment of a method of forming an integrated SOFC stack is illustrated and generally designated 1700. The method 1700 may include forming a first green cell structure having a first green electrode layer, a green electrolyte layer overlying the first green electrode layer, and a second green electrode layer overlying the green electrolyte layer, at 1702.

Figure 18:
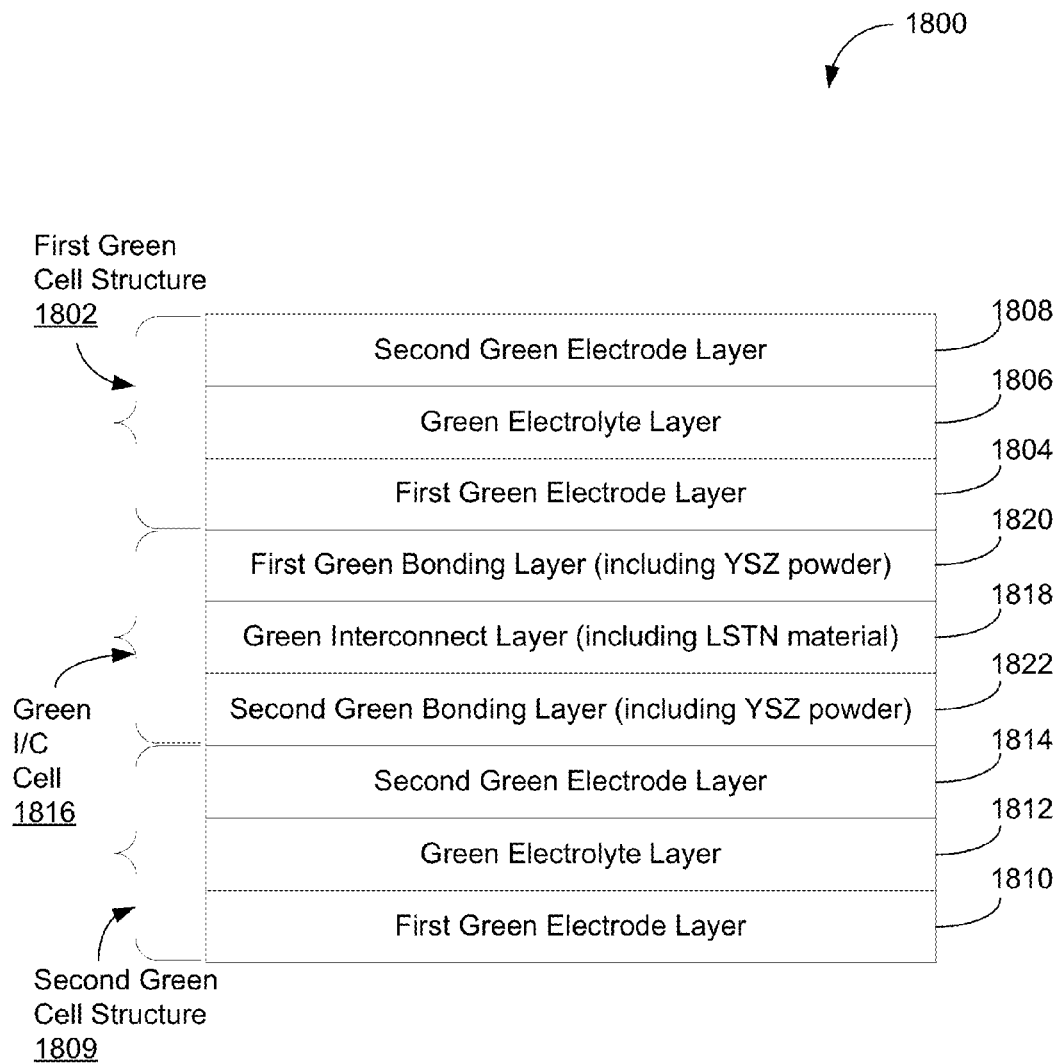
FIG. 18 illustrates a particular embodiment of a green SOFC cell stack according to an embodiment.

For reference purposes, FIG. 18 illustrates an exemplary SOFC article 1800 that includes multiple green layers to be formed into an integrated SOFC component (e.g., and SOFC stack). As an illustrative example, the method 1700 may include forming a first green cell structure 1802 having a first green electrode layer 1804, a green electrolyte layer 1806 overlying the first green electrode layer 1804, and a second green electrode layer 1808 overlying the green electrolyte layer 1806.

The method 1700 may include forming a second green cell structure having a first green electrode layer, a green electrolyte layer overlying the first green electrode layer, and a second green electrode layer overlying the green electrolyte layer, at 1704. For example, referring to FIG. 18, the method 1700 may include forming a second green cell structure 1809 having a first green electrode layer 1810, a green electrolyte layer 1812 overlying the first green electrode layer 1810, and a second green electrode layer 1814 overlying the green electrolyte layer 1812.

The method 1700 may include forming a green interconnect cell disposed between the first green cell structure and the second green cell structure, at 1706. For example, referring to FIG. 18, the method 1700 may include forming a green interconnect cell 1816 disposed between the first green cell structure 1802 and the second green cell structure 1809.

In the embodiment illustrated in FIG. 18, the green interconnect cell 1816 includes a green interconnect layer 1818, a first green bonding layer 1820, and a second green bonding layer 1822. As an illustrative, non-limiting embodiment, the green interconnect layer 1818 may include a niobium doped lanthanum strontium titanate (LSTN) material. The first green bonding layer 1820 may be disposed between the green interconnect layer 1818 and the first green cell structure 1802, and the second green bonding layer 1822 may be disposed between the green interconnect layer 1818 and the second green cell structure 1809. The first and second green bonding layers 1820, 1822 may include an YSZ powder having a monomodal particle size distribution with a $d_{50}$ that is greater than 1 μm and a $d_{90}$ that is greater than 2 μm.

In a particular embodiment, the YSZ powder may have a monomodal medium particle size distribution with a $d_{90}$ that is greater than 2.5 μm. Further, the YSZ powder may have a monomodal particle size distribution with a $d_{10}$ that is greater than 0.5 μm or even greater than 0.6 μm. In addition, substantially all particles of the YSZ powder may have a particle size diameter that is less than 10 μm. In a particular embodiment, a specific surface area (SSA) of the YSZ powder may be not greater than 4 $m^2/g$, such as not greater than 3 $m^2/g$, or even not greater than 2.5 $m^2/g$.

The method 1700 may further include sintering (e.g., free sintering, hot pressing) the first green cell structure, the green interconnect cell, and the second green cell structure to integrally bond the first green cell structure, the green interconnect cell and the second green cell structure to form an integrated SOFC stack with densified electrolyte and interconnect layers, at 1708. For example, referring to FIG. 18, the method 1700 may include sintering the first green cell structure 1802, the green interconnect cell 1816, and the second green cell structure 1809 together to integrally bond the first green cell structure 1802, the green interconnect cell 1816 and the second green cell structure 1809 to form an integrated SOFC cell stack with densified electrolyte and interconnect layers.

In a particular illustrative embodiment, the first green electrode layer 1804 of the first green cell structure 1802 may be a green cathode layer, and the second green electrode layer 1814 of the second green cell structure 1809 may be a green anode layer. In this case, the sintering operation may result in formation of the integrated, densified interconnect cells 200 and 1200 illustrated in FIGS. 2 and 12, respectively.

In a particular embodiment, the YSZ powder that is included in the green anode bonding layer (e.g., the second green bonding layer 1822) may have a different particle size distribution than the YSZ powder of the green anode layer (e.g., the second green electrode layer 1814). That is, the YSZ powder that is included in the green anode layer may have a PSD type other than a monomodal particle size distribution with a $d_{50}$ that is greater than 1 μm and a $d_{90}$ that is greater than 2 μm.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A bonding layer disposed between an interconnect layer and an electrode layer of a solid oxide fuel cell article, the bonding layer formed from a yttria stabilized zirconia powder having a monomodal particle size distribution with a $d_{50}$ that is greater than 0.7 μm and a $d_{90}$ that is 1.5 μm or greater.

2. The bonding layer of claim 1, wherein the yttria stabilized zirconia powder has a monomodal particle size distribution with a $d_{50}$ that is greater than 1 μm and a $d_{90}$ that is greater than 2 μm.

3. The bonding layer of claim 1, wherein the yttria stabilized zirconia powder has a monomodal particle size distribution with a $d_{50}$ that is greater than 2 μm and a $d_{90}$ that is greater than 4 μm.

4. The bonding layer of claim 1, wherein the yttria stabilized zirconia powder has a monomodal particle size distribution with a $d_{10}$ that is not less than about 0.5 μm.

5. The bonding layer of claim 1, wherein the yttria stabilized zirconia powder has a specific surface area (SSA) that is not greater than about 3 m2/g.

6. The bonding layer of claim 1, wherein not less than 99 Vol % of particles of the yttria stabilized zirconia powder have a particle size diameter that is less than 10 μm.

7. The bonding layer of claim 1, wherein the electrode layer is a cathode layer and wherein the bonding layer further includes a lanthanum strontium manganite (LSM) material.

8. The bonding layer of claim 1, wherein the electrode layer is an anode layer and wherein the bonding layer further includes nickel.

9. A solid oxide fuel cell stack, comprising:
a first electrode layer;
a first electrolyte layer overlying the first electrode layer;
a second electrode layer overlying the first electrolyte layer;
an interconnect cell disposed between the second electrode layer and a third electrode layer of the solid oxide fuel cell stack, the interconnect cell comprising:
an interconnect layer;
a first bonding layer disposed between the interconnect layer and the second electrode layer, wherein the first bonding layer includes yttria stabilized zirconia, and wherein the first bonding layer is formed from a yttria stabilized zirconia powder having a monomodal particle size distribution with a $d_{50}$ that is greater than 0.7 μm and a $d_{90}$ that is 1.5 μm or greater; and
a second bonding layer disposed between the interconnect layer and the third electrode layer, wherein the second bonding layer includes yttria stabilized zirconia, and wherein the second bonding layer is formed from a yttria stabilized zirconia powder having a monomodal particle size distribution with a $d_{50}$ that is greater than 0.7 μm and a $d_{90}$ that is 1.5 μm or greater;
a second electrolyte layer overlying the third electrode layer; and
a fourth electrode layer overlying the second electrolyte layer.

10. The solid oxide fuel cell stack of claim 9, wherein the yttria stabilized zirconia powder forming the first bonding layer or the second bonding layer has a monomodal particle size distribution with a $d_{50}$ that is greater than 1 μm and a $d_{90}$ that is greater than 2 μm.

11. The solid oxide fuel cell stack of claim 9, wherein the yttria stabilized zirconia powder forming the first bonding layer or the second bonding layer has a monomodal particle size distribution with a $d_{50}$ that is greater than 2 μm and a $d_{90}$ that is greater than 4 μm.

12. The solid oxide fuel cell stack of claim 9, wherein the second electrode layer is a cathode layer that includes a lanthanum strontium manganite (LSM) material and wherein the first bonding layer further includes a lanthanum strontium manganite (LS M) material.

13. The solid oxide fuel cell stack of claim 12, wherein the third electrode layer is an anode layer that includes nickel and yttria stabilized zirconia and wherein the second bonding layer further includes nickel.

14. The solid oxide fuel cell stack of claim 9, wherein the second electrode layer is an anode layer that includes nickel and yttria stabilized zirconia and wherein the first bonding layer further includes nickel.

15. The solid oxide fuel cell stack of claim 9, wherein the second bonding layer further includes a lanthanum strontium manganite (LSM) material.

16. The solid oxide fuel cell stack of claim 9, wherein the interconnect layer includes niobium doped lanthanum strontium titanate (LSTN) material.

17. The solid oxide fuel cell stack of claim 9, wherein not less than 99 vol % of particles of the yttria stabilized zirconia powder forming the first bonding layer or the second bonding layer have a particle size diameter that is less than 10 μm.

18. The solid oxide fuel cell stack of claim 9, wherein the interconnect cell is configured to reach a Steady State Area Specific Resistance (ASR) (ohms.cm$^2$) within a time period of not less than about 600 hours of operation.

19. A method of forming an integrated solid oxide fuel cell stack, the method comprising:
forming a first green cell structure having a first green electrode layer, a green electrolyte layer overlaying the first green electrode layer, and a second green electrode layer overlaying the green electrolyte layer;
forming a second green cell structure having a first green electrode layer, a green electrolyte layer overlaying the first green electrode layer, and a second green electrode layer overlaying the green electrolyte layer;

forming a green interconnect cell disposed between the first green cell structure and the second green cell structure, wherein the green interconnect cell comprises:
a green interconnect layer;
a first green bonding layer disposed between the interconnect layer and the first green cell structure, wherein the first green bonding layer includes a yttria stabilized zirconia powder having a monomodal particle size distribution with a $d_{50}$ that is greater than 0.7 μm and a $d_{90}$ that is 1.5 μm or greater; and
a second green bonding layer disposed between the interconnect layer and the second green cell structure, wherein the second green bonding layer includes a yttria stabilized zirconia powder having a monomodal particle size distribution with a $d_{50}$ that is greater than 0.7 μm and a $d_{90}$ that is 1.5 μm or greater; and
sintering the first green cell structure, the green interconnect cell, and the second green cell structure to integrally bond the first green cell structure, the green interconnect cell and the second green cell structure to form an integrated solid oxide fuel cell stack.

20. The method of claim 19, wherein sintering includes hot pressing the first green cell structure, the green interconnect cell, and the second green cell structure together to form the integrated solid oxide fuel cell stack.

21. The method of claim 19, wherein sintering includes free sintering the first green cell structure, the green interconnect cell, and the second green cell structure together to form the integrated solid oxide fuel cell stack.

22. The method of claim 19, wherein the first green bonding layer further includes a NiO powder and wherein not less than 99 vol % of particles of the NiO powder have a particle size diameter that is less than 10 μm.

23. The method of claim 19, wherein the second green bonding layer further includes a lanthanum strontium manganite (LSM) powder and wherein not less than 99 vol % of particles of the LSM powder have a particle size diameter that is less than 10 μm.

* * * * *